(12) United States Patent
Furuta

(10) Patent No.: US 11,766,910 B2
(45) Date of Patent: Sep. 26, 2023

(54) VEHICLE CONTROL METHOD AND VEHICLE CONTROL APPARATUS

(71) Applicant: TOYOTA JIDOSHA KABUSHIKI KAISHA, Toyota (JP)

(72) Inventor: Hiroki Furuta, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 168 days.

(21) Appl. No.: 17/501,444

(22) Filed: Oct. 14, 2021

(65) Prior Publication Data

US 2022/0118811 A1 Apr. 21, 2022

(30) Foreign Application Priority Data

Oct. 19, 2020 (JP) ................................ 2020-175309

(51) Int. Cl.
*B60G 17/0165* (2006.01)

(52) U.S. Cl.
CPC ...... *B60G 17/0165* (2013.01); *B60G 2400/82* (2013.01); *B60G 2500/104* (2013.01); *B60G 2600/17* (2013.01); *B60G 2600/602* (2013.01)

(58) Field of Classification Search
CPC ............ B60G 17/0165; B60G 2400/60; B60G 2400/821; B60G 2500/22
See application file for complete search history.

(56) References Cited

U.S. PATENT DOCUMENTS

| | | | | |
|---|---|---|---|---|
| 9,114,683 B2* | 8/2015 | Kikuchi | ............. | B60G 17/0195 |
| 9,963,006 B2* | 5/2018 | Kubota | ............. | B60G 17/0165 |
| 11,065,931 B1* | 7/2021 | Keas | .................... | B60G 15/061 |
| 11,299,001 B2* | 4/2022 | Ohno | ................. | B60G 17/0157 |
| 11,318,804 B2* | 5/2022 | Minakuchi | ........... | B60W 40/112 |
| 11,351,833 B2* | 6/2022 | Toyohira | ................ | B60G 17/06 |
| 11,560,033 B2* | 1/2023 | Yamazaki | ............. | B62D 35/02 |
| 11,602,970 B2* | 3/2023 | Goto | ................. | B60G 17/0157 |
| 2002/0045977 A1* | 4/2002 | Uchiyama | ........ | B60G 17/01908 |
| | | | | 280/5.515 |
| 2010/0138108 A1* | 6/2010 | Kajino | ................. | B60G 17/016 |
| | | | | 701/38 |
| 2010/0204885 A1* | 8/2010 | Kajino | ............... | B60G 21/0555 |
| | | | | 701/37 |
| 2014/0001717 A1* | 1/2014 | Giovanardi | ........ | B60G 17/0165 |
| | | | | 280/5.518 |

(Continued)

*Primary Examiner* — Toan C To
(74) *Attorney, Agent, or Firm* — Dinsmore & Shohl LLP

(57) ABSTRACT

A vehicle control method includes a step of executing preview vibration damping control for controlling a control force generating apparatus, when a wheel passes a predicated passage position, on the basis of a target control force computed by using a road surface displacement related value at the predicated passage position. The control method further includes a step of determining whether or not a predetermined condition is satisfied, the predetermined condition being satisfied when a time series change of the road surface displacement related value on a predicted route of the wheel falls within a controllable range of the control force generating apparatus, and a step of executing a particular process for reducing the magnitude of the road surface displacement related value at the predicted passage position when the predetermined condition is not satisfied.

8 Claims, 9 Drawing Sheets

(56) References Cited

U.S. PATENT DOCUMENTS

| | | | |
|---|---|---|---|
| 2015/0046035 A1* | 2/2015 | Kikuchi | B60G 17/0195 |
| | | | 701/37 |
| 2017/0166019 A1* | 6/2017 | Singh | B60C 23/0408 |
| 2017/0274724 A1* | 9/2017 | Liu | B60G 17/01933 |
| 2017/0320368 A1* | 11/2017 | Masamura | B60G 17/018 |
| 2018/0079272 A1* | 3/2018 | Aikin | B60G 17/0195 |
| 2018/0154723 A1* | 6/2018 | Anderson | H02K 11/33 |
| 2018/0162186 A1 | 6/2018 | Anderson et al. | |
| 2018/0361813 A1* | 12/2018 | Ohno | B60G 17/0157 |
| 2019/0079539 A1* | 3/2019 | Sridhar | B60W 40/06 |
| 2019/0263210 A1* | 8/2019 | Nasu | B60T 8/172 |
| 2020/0023705 A1* | 1/2020 | Hirao | B60G 17/0165 |
| 2021/0379953 A1* | 12/2021 | Furuta | B60G 17/06 |
| 2021/0387498 A1* | 12/2021 | Furuta | B60G 17/0165 |
| 2021/0402841 A1* | 12/2021 | Furuta | B60G 17/08 |
| 2022/0105770 A1* | 4/2022 | Furuta | B60G 17/056 |
| 2022/0111695 A1* | 4/2022 | Furuta | B60G 17/0165 |

\* cited by examiner

VEHICLE CONTROL METHOD AND VEHICLE CONTROL APPARATUS

CROSS-REFERENCE TO RELATED APPLICATION

This application claims priority to Japanese Patent Application No. 2020-175309 filed on Oct. 19, 2020, the content of which is hereby incorporated by reference in its entirety into this application.

BACKGROUND

Technical Field

The present disclosure relates to a method for controlling a vehicle and to an apparatus for controlling a vehicle.

Description of the Related Art

Conventionally, there has been proposed an apparatus (hereinafter referred to as the "conventional apparatus") which controls control force generating apparatuses (for example, actuators) provided for wheels of a vehicle by using a piece of information relating to the vertical displacement of a road surface that the wheels of the vehicle are predicted to pass (road surface displacement), thereby performing control for suppressing vibrations of a sprung portion of the vehicle (see, for example, US Patent Application Publication No. 2018/0162186). Such control is also called "preview vibration damping control."

For example, the conventional apparatus executes the preview vibration damping control in a situation where the vehicle is traveling on a road whose road surface displacement has a large amplitude. Here, it is assumed that the magnitude of the road surface displacement falls outside a controllable range of each actuator. In such a case, the conventional apparatus causes the actuators to output the maximum control force despite the effect of suppressing the vibration of the sprung portion of the vehicle being small. Accordingly, the actuators consume excess energy. Furthermore, in the case where the actuators continuously output the maximum control force, the actuators may suffer heat damage.

SUMMARY

The present disclosure provides a technique for reducing the possibility that the output of a control force generating apparatus (for example, actuator) falls outside the controllable range of the control force generating apparatus, as compared with the conventional apparatus.

The present disclosure provides a control method for controlling a vehicle. The vehicle includes a control force generating apparatus configured to generate control force in a vertical direction for damping vibration of a sprung portion of the vehicle, the control force being applied between at least one wheel and a portion of a body of the vehicle, which portion corresponds to a position of the wheel, and a control unit for controlling the control force generating apparatus.

The control method comprises:
a step in which the control unit computes a predicted route that the wheel is predicted to pass;
a step in which the control unit obtains first data from road surface information which is data in which a relationship is established between position information representing a position on a road surface and a road surface displacement related value which relates to a vertical displacement of the road surface at the position represented by the position information, the first data representing a time series change of the road surface displacement related value on the predicted route;
a step in which the control unit obtains, from the first data, the road surface displacement related value at a predicted passage position that the wheel is predicted to pass when a predetermined time elapses from the present point in time;
a step in which the control unit computes a target control force (Fct) by using the road surface displacement related value at the predicted passage position; and
a step in which the control unit executes preview vibration damping control for controlling the control force generating apparatus in such a manner that the control force (Fc) becomes equal to the target control force when the wheel passes the predicted passage position.

The control method further comprises:
a step in which the control unit determines whether or not a predetermined condition is satisfied on the basis of the first data, the predetermined condition being satisfied when the time series change of the road surface displacement related value on the predicted route falls within a controllable range of the control force generating apparatus; and
a step in which the control unit executes a particular process for reducing a magnitude of the road surface displacement related value at the predicted passage position when the predetermined condition is not satisfied.

By virtue of the above-described configuration, in the case where the predetermined condition is not satisfied (the case where the time series change of the road surface displacement related value on the predicted route falls outside the controllable range of the control force generating apparatus), the particular process is executed. Accordingly, it is possible to reduce the magnitude of the road surface displacement related value at the predicted passage position so that the magnitude of the road surface displacement related value falls within the controllable range of the control force generating apparatus. As a result, it is possible to reduce the possibility that excess energy is consumed by the control force generating apparatus. Furthermore, it is possible to prevent the control force generating apparatus from suffering heat damage.

In the control method, the step of executing the particular process may include executing a high-pass filter process on the first data.

As to a waveform represented by the first data, the amplitudes of components in a low frequency band tend to be large. By virtue of the above-described configuration, a high-pass filter process is performed on the first data. Therefore, it is possible to attenuate or remove the components in the low frequency band. As a result, it is possible to reduce the magnitude of the road surface displacement related value at the predicted passage position so that the magnitude of the road surface displacement related value falls within the controllable range of the control force generating apparatus.

In the control method, the step of computing the target control force may include computing the target control force by using the road surface displacement related value at the predicted passage position and a gain for the road surface displacement related value at the predicted passage position. In this case, the step of executing the particular process may include reducing the gain in the case where the predetermined condition is not satisfied, so that the gain becomes smaller as compared with the case where the predetermined condition is satisfied.

By virtue of the above-described configuration, it is possible to limit the magnitude of the road surface displacement related value at the predicted passage position, by changing the gain for the road surface displacement related value at the predicted passage position, so that the magnitude of the road surface displacement related value falls within the controllable range of the control force generating apparatus.

In the control method, the step of executing the particular process may include:

computing an index value which represents the degree of deviation of the road surface displacement related value in the first data from the controllable range, and executing a process of reducing the magnitude of the road surface displacement related value at the predicted passage position to a degree that increases with the index value.

By virtue of the above-described configuration, the magnitude of the road surface displacement related value decreases in accordance with the index value. It is possible to enhance the effect of reducing the magnitude of the road surface displacement related value at the predicted passage position so that the magnitude of the road surface displacement related value falls within the controllable range of the control force generating apparatus.

In the control method, the step of determining whether or not the predetermined condition is satisfied may include:

determining that the predetermined condition is satisfied when the maximum value ($z_{1\_max1}$) of the magnitude of the road surface displacement related value in the first data is equal to or less than a threshold (Th1) set on the basis of the controllable range of the control force generating apparatus, and determining that the predetermined condition is not satisfied when the maximum value is greater than the threshold.

The control force generating apparatus may include an active stabilizer apparatus. The wheel may include a first wheel on a left side of the vehicle and a second wheel on a right side of the vehicle.

In this case, in the control method, the step of determining whether or not the predetermined condition is satisfied may include:

setting the threshold to a first value in the case where a first waveform represented by the first data for the first wheel and a second waveform represented by the first data for the second wheel are in phase relative to each other, and setting the threshold to a second value greater than the first value in the case where the first waveform and the second waveform are in anti-phase relative to each other.

By virtue of the above-described configuration, it is possible to change the threshold in the predetermined condition to a proper value in accordance with whether the first waveform and the second waveform are in phase or in anti-phase.

In the control method, the road surface displacement related value may include at least one of road surface displacement ($z_0$) representing displacement of the road surface in the vertical direction, road surface displacement speed ($dz_0$) representing a derivative value of the road surface displacement with respect to time, unsprung displacement ($z_1$) representing displacement of an unsprung portion of the vehicle in the vertical direction, and unsprung speed ($dz_1$) representing a derivative value of the unsprung displacement with respect to time.

The present disclosure provides a control apparatus for controlling a vehicle.

The control apparatus comprises:

a control force generating apparatus configured to generate control force in a vertical direction for damping vibration of a sprung portion of the vehicle, the control force being applied between at least one wheel and a portion of a body of the vehicle, which portion corresponds to a position of the wheel; and a control unit for controlling the control force generating apparatus.

The control unit is configured to determine a predicted route that the wheel is predicted to pass, to obtain first data from road surface information which is data in which a relationship is established between position information representing a position on a road surface and a road surface displacement related value which relates to a vertical displacement of the road surface at the position represented by the position information, the first data representing a time series change of the road surface displacement related value on the predicted route, to obtain, from the first data, the road surface displacement related value at a predicted passage position that the wheel is predicted to pass when a predetermined time elapses from the present point in time, to compute a target control force (Fct) by using the road surface displacement related value at the predicted passage position, and to execute preview vibration damping control for controlling the control force generating apparatus in such a manner that the control force (Fc) becomes equal to the target control force when the wheel passes the predicted passage position.

The control unit is further configured to determine whether or not a predetermined condition is satisfied on the basis of the first data, the predetermined condition being satisfied when the time series change of the road surface displacement related value on the predicted route falls within a controllable range of the control force generating apparatus, and to execute a particular process for reducing the road surface displacement related value at the predicted passage position when the predetermined condition is not satisfied.

The control unit may be realized by a microprocessor programed in order to execute one or more functions described in the present specification. The control unit may be entirely or partially realized by hardware composed of, for example, ASIC; i.e., an integrated circuit dedicated to one or more applications.

In the above description, constituent elements corresponding to those of embodiments which will be described later are accompanied by parenthesized names and/or symbols which are used in the embodiments; however, the constituent elements are not limited to those in the embodiments defined by the names and/or the symbols. Other objects, other features, and attendant advantages of the present disclosure will be readily appreciated from the following description of the embodiments which is made with reference to the accompanying drawings.

DESCRIPTION OF THE EMBODIMENTS (Configuration of Vibration Damping Control Apparatus)

Figure 1:
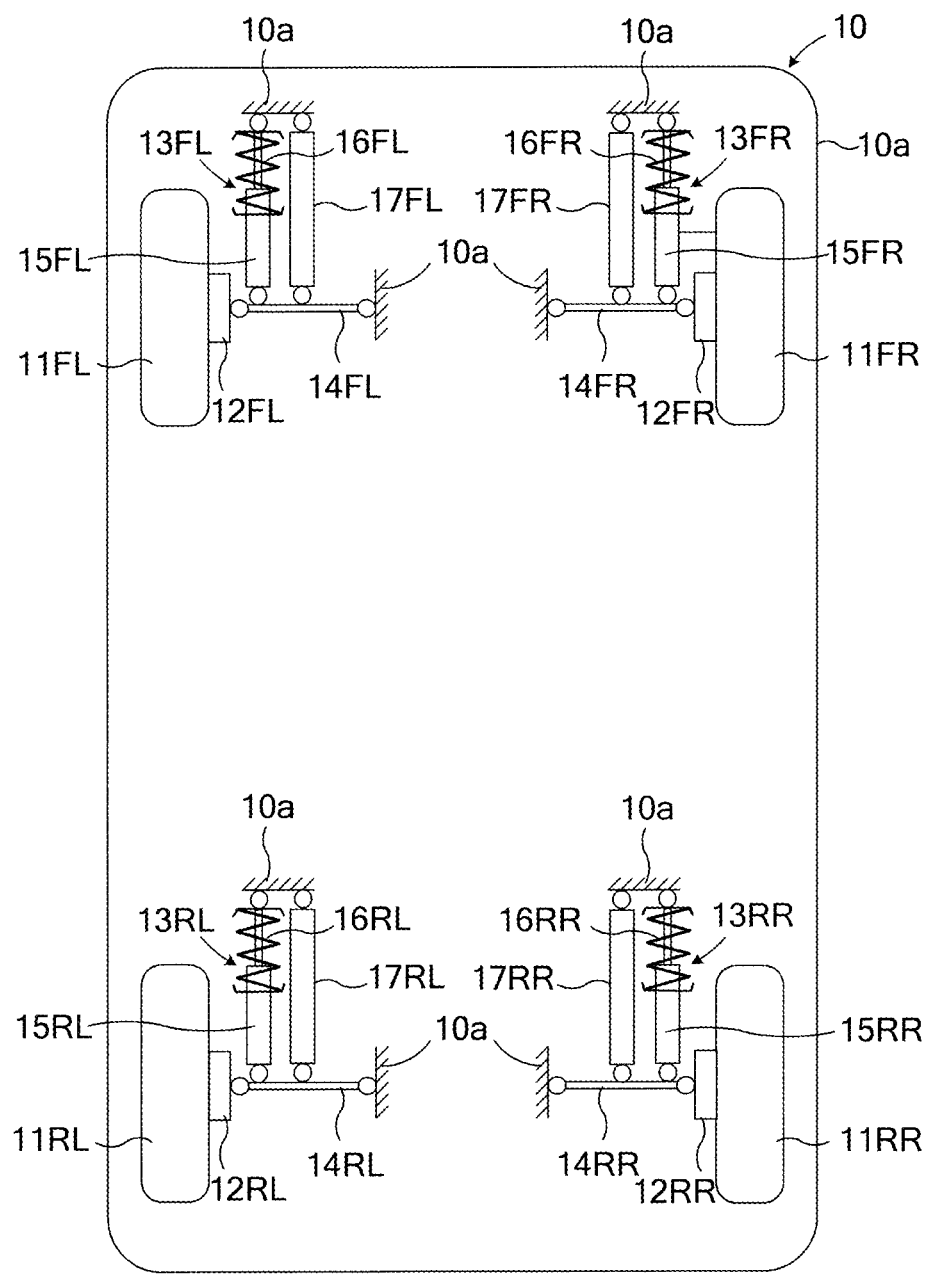
FIG. 1 is a schematic diagram of a vehicle to which a vibration damping control apparatus according to an embodiment is applied.
Figure 2:
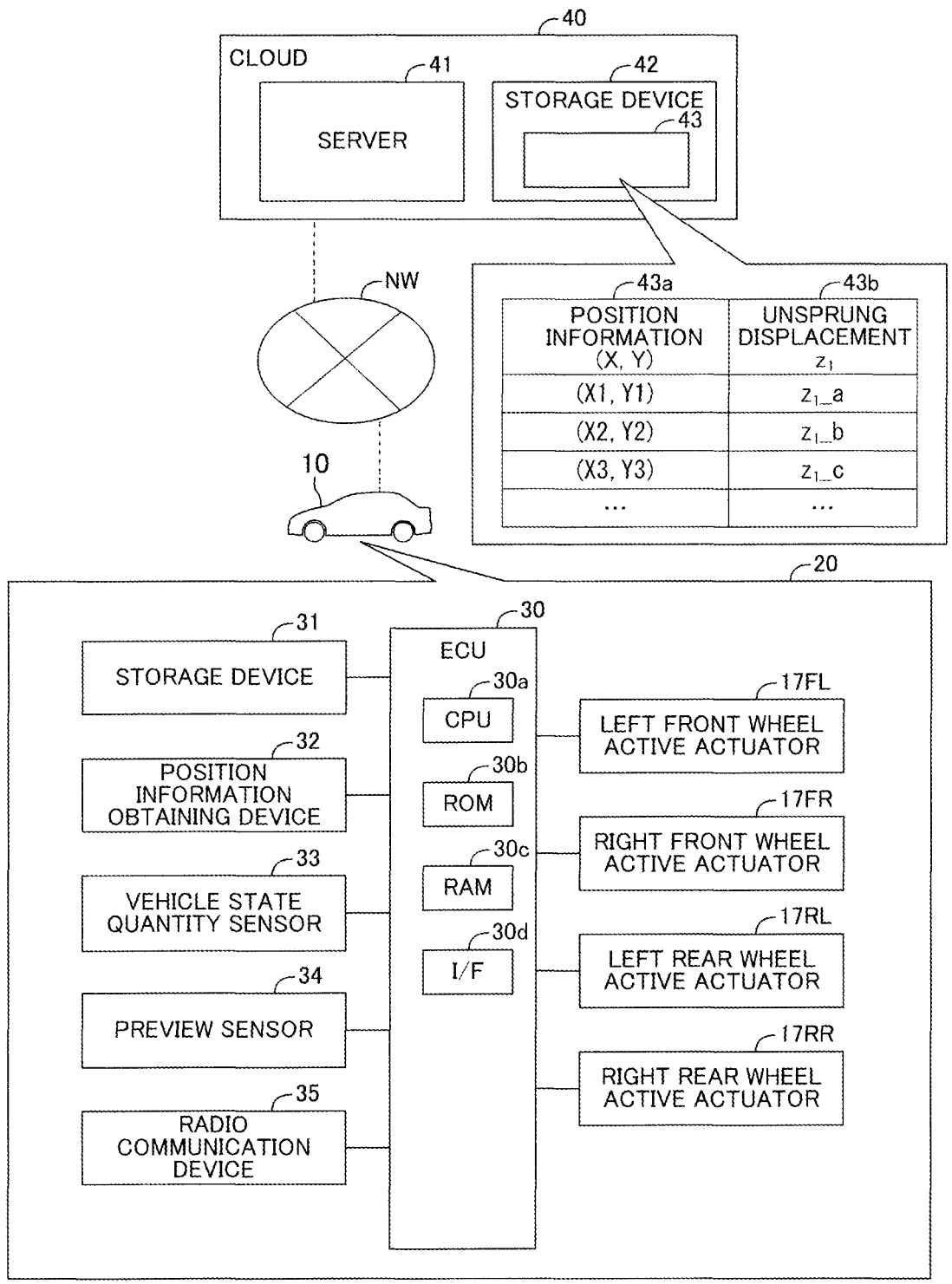
FIG. 2 is a schematic diagram of the vibration damping control apparatus according to the embodiment.

A vibration damping control apparatus according to an embodiment is applied to a vehicle 10 shown in FIG. 1. As shown in FIG. 2, hereinafter, this vibration damping control apparatus is referred to also as the "vibration damping control apparatus 20."

As shown in FIG. 1, the vehicle 10 includes a left front wheel 11FL, a right front wheel 11FR, a left rear wheel 11RL, and a right rear wheel 11RR. Notably, the left front wheel 11FL, the right front wheel 11FR, the left rear wheel 11RL, and the right rear wheel 11RR will be referred to as the "wheel(s) 11" in the case where these wheels are not required to be distinguished from one another. Similarly, the left front wheel 11FL and the right front wheel 11FR will be referred to as the "front wheel(s) 11F." Similarly, the left rear wheel 11RL and the right rear wheel 11RR will be referred to as the "rear wheel(s) 11R." Notably, in reference numerals for denoting various components, a suffix "FL" corresponds to the left front wheel 11FL, a suffix "FR" corresponds to the right front wheel 11FR, a suffix "RL" corresponds to the left rear wheel 11RL, and a suffix "RR" corresponds to the right rear wheel 11RR.

The left front wheel 11FL is rotatably supported by a body 10a via a wheel support member 12FL. The right front wheel 11FR is rotatably supported by the body 10a via a wheel support member 12FR. The left rear wheel 11RL is rotatably supported by the body 10a via a wheel support member 12RL. The right rear wheel 11RR is rotatably supported by the body 10a via a wheel support member 12RR. Notably, the wheel support members 12FL to 12RR will be referred to as the "wheel support member(s) 12" in the case where these wheel support members are not required to be distinguished from one another.

The vehicle 10 further includes a left front wheel suspension 13FL, a right front wheel suspension 13FR, a left rear wheel suspension 13RL, and a right rear wheel suspension 13RR. These suspensions 13FL to 13RR will now be described in detail. These suspensions 13FL to 13RR are independent-type suspensions. However, the suspensions 13FL to 13RR may be suspensions of a different type.

The left front wheel suspension 13FL suspends the left front wheel 11FL from the body 10a and includes a suspension arm 14FL, a shock absorber 15FL, and a suspension spring 16FL. The right front wheel suspension 13FR suspends the right front wheel 11FR from the body 10a and includes a suspension arm 14FR, a shock absorber 15FR, and a suspension spring 16FR.

The left rear wheel suspension 13RL suspends the left rear wheel 11RL from the body 10a and includes a suspension arm 14RL, a shock absorber 15RL, and a suspension spring 16RL. The right rear wheel suspension 13RR suspends the right rear wheel 11RR from the body 10a and includes a suspension arm 14RR, a shock absorber 15RR, and a suspension spring 16RR.

Notably, the left front wheel suspension 13FL, the right front wheel suspension 13FR, the left rear wheel suspension 13RL, and the right rear wheel suspension 13RR will be referred to as the "suspension(s) 13" in the case where these suspensions are not required to be distinguished from one another. Similarly, the suspension arms 14FL to 14RR will be referred to as the "suspension arm(s) 14." Similarly, the shock absorbers 15FL to 15RR will be referred to as the "shock absorber(s) 15." Similarly, the suspension springs 16FL to 16RR will be referred to as the "suspension spring(s) 16."

The suspension arm 14 connects the wheel support member 12 to the body 10a. In FIG. 1, a single suspension arm 14 is provided for each suspension 13. In a different example, a plurality of suspension arms 14 may be provided for each suspension 13.

The shock absorber 15 is disposed between the body 10a and the suspension arm 14. The upper end of the shock absorber 15 is connected to the body 10a, and the lower end of the shock absorber 15 is connected to the suspension arm 14. The suspension spring 16 is disposed between the body 10a and the suspension arm 14 via the shock absorber 15. Namely, the upper end of the suspension spring 16 is connected to the body 10a, and the lower end of the suspension spring 16 is connected to the cylinder of the shock absorber 15. Notably, in the case where the suspension spring 16 and the shock absorber 15 are disposed in series as described above, the upper end of the shock absorber 15 may be connected to the body 10a, and the lower end of the shock absorber 15 may be connected to the wheel support member 12.

In the present example, the shock absorber 15 is of a damping force fixed type. In a different example, the shock absorber 15 may be of a damping force adjustable type. Furthermore, the suspension spring 16 may be provided between the body 10a and the suspension arm 14 without intermediation of the shock absorber 15. Specifically, the upper end of the suspension spring 16 may be connected to the body 10a, and the lower end of the suspension spring 16 may be connected to the suspension arm 14. Notably, in the case where the suspension spring 16 and the shock absorber 15 are disposed in parallel as described above, the suspension spring 16 and the shock absorber 15 may be disposed in parallel between the body 10a and the wheel support member 12.

Figure 4:
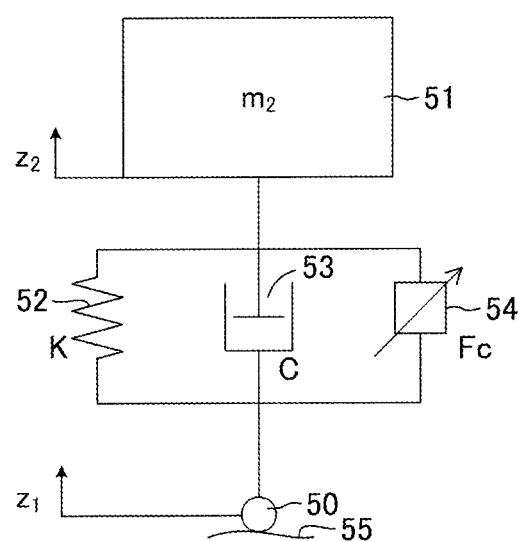
FIG. 4 is a view showing a single wheel model of the vehicle.

Of members including the wheel 11, the shock absorber 15, etc., portions located on the wheel 11 side of the suspension spring 16 will be collectively referred to as an "unsprung portion 50" or an "unsprung member 50" (see FIG. 4). On the other hand, of the members including the body 10a, the shock absorber 15, etc., portions located on the body 10a side of the suspension spring 16 will be collectively referred to as a "sprung portion 51" or a "sprung member 51" (see FIG. 4).

Furthermore, a left front wheel active actuator 17FL, a right front wheel active actuator 17FR, a left rear wheel active actuator 17RL, and a right rear wheel active actuator 17RR are provided between the body 10a and the suspension arms 14FL to 14RR, respectively. These active actuators 17FL to 17RR are disposed in parallel with the shock absorbers 15FL to 15RR and the suspension springs 16FL to 16RR, respectively.

Notably, the left front wheel active actuator 17FL, the right front wheel active actuator 17FR, the left rear wheel active actuator 17RL, and the right rear wheel active actuator 17RR will be referred to as the "active actuator(s) 17" in the case where these active actuators are not required to be distinguished from one another. Similarly, the left front wheel active actuator 17FL and the right front wheel active actuator 17FR will be referred to as the "front wheel active actuator(s) 17F." Similarly, the left rear wheel active actuator 17RL and the right rear wheel active actuator 17RR will be referred to as the "rear wheel active actuator(s) 17R."

The active actuator 17 generates a control force Fc on the basis of a control instruction from an electronic controller 30 shown in FIG. 2. The control force Fc is a force in the vertical direction which acts between the body 10a and the wheel 11 (namely, between the sprung portion 51 and the unsprung portion 50) so as to damp vibrations of the sprung portion 51. Notably, the electronic controller 30 will be referred to as the "ECU 30" and may be referred to as the "control unit" or the "controller." Furthermore, the active actuator 17 may be referred to as the "control force generating apparatus." The active actuator 17 is an electromagnetic active actuator. The active actuator 17 constitutes an active suspension in cooperation with the shock absorber 15, the suspension spring 16, etc.

As shown in FIG. 2, the vibration damping control apparatus 20 includes the above-mentioned ECU 30, a storage device 31, a position information obtaining device 32, a vehicle state quantity sensor 33, a preview sensor 34, and a radio communication device 35. Furthermore, the vibration damping control apparatus 20 includes the above-described active actuators 17FL to 17RR.

The ECU 30 includes a microcomputer. The microcomputer includes a CPU 30a, a ROM 30b, a RAM 30c, an interface (I/F) 30d, etc. The CPU 30a realizes various functions by executing instructions (programs, routines) stored in the ROM 30b.

The ECU 30 is connected to the storage device 31 into which information can be written and from which information can be read. In the present example, the storage device 31 is a hard disk drive. The ECU 30 can store information in the storage device 31 and can read out the information stored in the storage device 31. Notably, the storage device 31 is not limited to the hard disk drive and may be a well known storage device or storage medium into which information can be written and from which information can be read.

The ECU 30 is connected to the position information obtaining device 32, the vehicle state quantity sensor 33, the preview sensor 34, and the radio communication device 35.

The position information obtaining device 32 includes a GNSS (Global Navigation Satellite System) receiver and a map database. The GNSS receiver receives from satellites signals (for example, GNSS signals) for detecting the position of the vehicle 10. The map database stores map information. The position information obtaining device 32 determines the current position (for example, latitude and longitude) of the vehicle 10 on the basis of the GNSS signals and outputs a signal representing the determined position. The position information obtaining device 32 is, for example, a navigation device.

The GNSS signals contain information regarding the moving speed of the vehicle 10 and information regarding an azimuth angle which represents the heading direction of the vehicle 10. Accordingly, the position information obtaining device 32 outputs the speed Vs of the vehicle 10 at the present point in time and the azimuth angle θ representing the heading direction of the vehicle 10. As to the azimuth angle θ, the north in azimuth is defined to be 0°. The azimuth angle θ increases clockwise. The east in azimuth is 90°, the south in azimuth is 180°, and the west in azimuth is 270°.

The vehicle state quantity sensor 33 includes a plurality of types of sensors for detecting the condition of the vehicle 10 (the speed, acceleration, direction, etc. of the vehicle 10). The vehicle state quantity sensor 33 includes a plurality of wheel speed sensors for detecting the wheel speeds of the wheels 11, a longitudinal acceleration sensor for detecting the acceleration of the vehicle 10 in the longitudinal direction, a lateral acceleration sensor for detecting the acceleration of the vehicle 10 in the lateral direction, and a yaw rate sensor for detecting the yaw rate of the vehicle 10. Notably, the ECU 30 may compute the speed Vs of the vehicle 10 on the basis of signals from the wheel speed sensors.

The preview sensor 34 is, for example, one of a camera sensor, a LiDAR, and a radar sensor, or a combination thereof. The preview sensor 34 obtains a value representing the displacement of a road surface in the vertical direction ahead of the vehicle 10 (namely, road surface displacement $z_0$, which will be described later).

The radio communication device 35 is a radio communication terminal which communicates with a cloud (data management apparatus) 40 through a network NW for information transfer therebetween. The cloud 40 includes a server 41 and at least one storage device 42.

The server 41 includes a CPU, a ROM, a RAM, an interface (I/F), etc. The server 41 searches and reads data stored in the storage device 42 and writes data into the storage device 42. Furthermore, in response to a request from the vibration damping control apparatus 20 (ECU 30), the server 41 provides the data stored in the storage device 42 (a road surface information map, which will be described later) to the vehicle 10 via the network NW.

Figure 3:
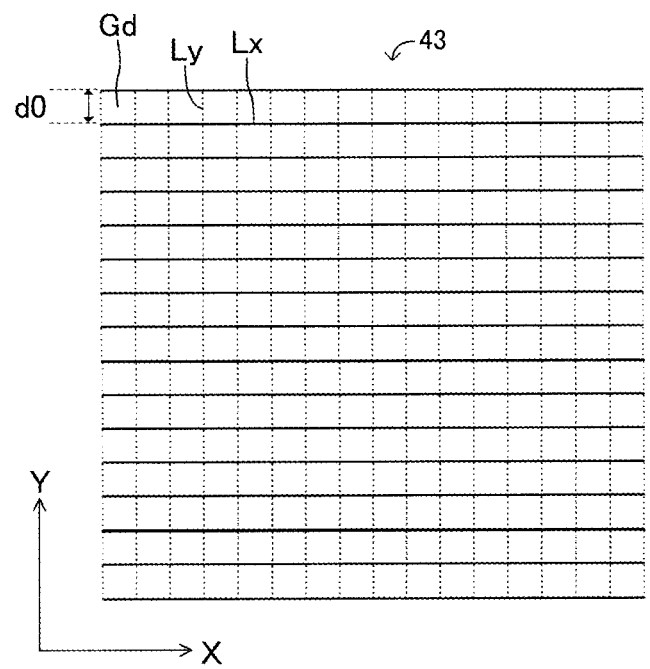
FIG. 3 is a chart used for describing a road surface information map.

The storage device 42 stores a road surface information map 43. As shown in FIG. 3, in the road surface information map 43, a road is divided into a plurality of square sections Gd (referred to also as "meshes") having the same size by a plurality of parallel lines Lx extending in an X direction and a plurality of parallel lines Ly extending in a Y direction. The distance d0 of each side of each section Gd is 50 mm to 150 mm. In the present example, the distance d0 is 100 mm. Notably, the shape of each section Gd is not limited to square and may be determined in accordance with the size and shape of the contact area of a tire of the wheel 11.

In a present example, the X direction of the road surface information map 43 coincides with the north in azimuth, and the Y direction is perpendicular to the X direction. The positions of each section Gd in the X direction and the Y direction are represented by Xm (m=1, 2, 3, . . . ) and Yn (n=1, 2, 3, . . . ).

A road surface displacement related value, which is a value relating to displacement of a road surface in the vertical direction, is set in each section Gd of the road surface information map 43. The road surface displacement related value contains at least one of road surface displacement $z_0$ representing the displacement of the road surface in the vertical direction, road surface displacement speed $dz_0$ representing the derivative value of the road surface displacement $z_0$ with respect to time, unsprung displacement $z_1$ representing the displacement of the unsprung portion 50 in the vertical direction, and unsprung speed $dz_1$ representing the derivative value of the unsprung displacement $z_1$ with respect to time. In the present example, the road surface displacement related value is the unsprung displacement $z_1$.

Accordingly, as shown in FIG. 2, the road surface information map 43 is data in which position information 43a representing a position on the road surface is related to an unsprung displacement (z1) 43b at the position represented by the position information 43a.

Referring back to FIG. 2, the ECU 30 is connected to the left front wheel active actuator 17FL, the right front wheel active actuator 17FR, the left rear wheel active actuator 17RL, and the right rear wheel active actuator 17RR via a drive circuit (not shown).

The ECU 30 computes the target control force Fct for each active actuator 17. The target control force Fct is control force for the preview vibration damping control; namely, control force for damping the vibration of the sprung portion 51 of the vehicle 10. The ECU 30 controls the active actuator 17 in such a manner that, at a point in time when the wheel 11 passes a predicted passage position which will be described later, the active actuator 17 generates a control force Fc corresponding to (equal to) the target control force Fct.

(Outline of Basic Preview Vibration Damping Control)

Now, the outline of basic preview vibration damping control executed by the vibration damping control apparatus 20 will be described. FIG. 4 shows a single wheel model of the vehicle 10 on a road surface 55.

A spring 52 corresponds to the suspension spring 16, a damper 53 corresponds to the shock absorber 15, and an actuator 54 corresponds to the active actuator 17.

In FIG. 4, the mass of the sprung portion 51 is labeled as sprung mass $m_2$. As described above, $z_1$ represents displacement of the unsprung portion 50 in the vertical direction (unsprung displacement). Displacement of the sprung portion 51 in the vertical direction will be referred to as sprung displacement $z_2$. The sprung displacement $z_2$ is the vertical displacement of the sprung portion 51 corresponding to the position of each wheel 11. The spring constant (equivalent spring constant) of the spring 52 is labeled as spring constant K. The damping coefficient (equivalent damping coefficient) of the damper 53 is labeled as damping coefficient C. The force generated by the actuator 54 is labeled as control force Fc.

Furthermore, the derivative values of $z_1$ and $z_2$ with respect to time are denoted by $dz_1$ and $dz_2$, respectively, and the second-order derivative values of $z_1$ and $z_2$ with respect to time are denoted by $ddz_1$ and $ddz_2$, respectively. In the following description, it is prescribed that $z_1$ and $z_2$ assume positive values for upward displacements, and, for forces generated by the spring 52, the damper 53, the actuator 54, etc., upward is positive.

In the single wheel model of the vehicle 10 shown in FIG. 4, the equation of motion for the motion of the sprung portion 51 in the vertical direction can be represented by expression (1).

$$m_2 ddz_2 = C(dz_1 - dz_2) + K(z_1 - z_2) - Fc \quad (1)$$

The damping coefficient C in expression (1) is assumed to be constant. However, since the actual damping coefficient changes with the stroke speed of the suspension 13, the damping coefficient C may be set to, for example, a value which changes with the derivative value of the stroke H with respect to time.

Furthermore, in the case where the vibration of the sprung portion 51 is completely cancelled out by the control force Fc (namely, in the case where all the sprung acceleration $ddz_2$, the sprung speed $dz_2$ and the sprung displacement $z_2$ become zero), the control force Fc is represented by expression (2).

$$Fc = C dz_1 + K z_1 \quad (2)$$

Accordingly, the control force Fc for damping the vibration of the sprung portion 51 can be represented by expression (3), where α is a control gain. Notably, the control gain α is an arbitrary constant which is greater than 0 and not greater than 1.

$$Fc = \alpha(C dz_1 + K z_1) \quad (3)$$

When expression (3) is applied to expression (1), expression (1) can be represented by the following expression (4).

$$m_2 ddz_2 = C(dz_1 - dz_2) + K(z_1 - z_2) - \alpha(C dz_1 + K z_1) \quad (4)$$

When this expression (4) is subjected to Laplace transformation and is arranged, the following expression (5) is obtained. Namely, the transfer function from the unsprung displacement $z_1$ to the sprung displacement $z_2$ is represented by expression (5). Notably, "s" in expression (5) is a Laplacian operator.

$$\frac{z_2}{z_1} = \frac{(1-\alpha)(Cs+K)}{m_2 s^2 + Cs + K} \quad (5)$$

According to expression (5), the transfer function changes with the control gain α. Expression (5) shows that when the control gain α is an arbitrary value which is greater than 0 and not greater than 1, the magnitude of the transfer function certainly becomes smaller than "1" (namely, the vibration of the sprung portion 51 can be reduced). Furthermore, expression (5) shows that when the control gain α is 1, since the magnitude of the transfer function becomes "0," the vibration of the sprung portion 51 is completely cancelled out. On the basis of expression (3), the target control force Fct is computed in accordance with the following expression (6). The target control force Fct is a target control force for damping the vibration of the sprung portion generated when the wheel 11 passes the predicted passage position. Notably, the gain $\beta_1$ in expression (6) corresponds to αC, and the gain $\beta_2$ in expression (6) corresponds to αK.

$$Fct = \beta_1 \times dz_1 + \beta_2 \times z_1 \quad (6)$$

As described above, the ECU 30 previously obtains (reads ahead) the unsprung displacement $z_1$ at a position (predicted passage position) which the wheel 11 passes in the future, and applies the obtained unsprung displacement $z_1$ to expression (6), thereby computing the target control force Fct.

The ECU 30 causes the actuator 54 to generate a control force Fc corresponding to the target control force Fct at a timing when the wheel 11 passes the predicted passage position (namely, a timing when the unsprung displacement $z_1$ applied to expression (6) occurs). As a result, the vibration of the sprung portion 51 can be reduced when the wheel 11 passes the predicted passage position (namely, when the unsprung displacement $z_1$ applied to expression (6) occurs).

Notably, the ECU 30 may compute the target control force Fct in accordance with the following expression (7) which is obtained by omitting the differential term ($\beta_1 \times dz_1$) from expression (6). In this case as well, the ECU 30 can cause the actuator 54 to generate the control force Fc for reducing the vibration of the sprung portion 51. Accordingly, as compared with the case where the control force Fc is not generated, the vibration of the sprung portion 51 can be reduced.

$$Fct = \beta_2 \times z_1 \quad (7)$$

The control for damping the vibration of the sprung portion 51 as described above will be referred to as "preview vibration damping control."

Notably, in the above-described single wheel model, the mass of the unsprung portion 50 and elastic deformation of a tire are ignored, and it is assumed that the unsprung displacement $z_1$ and the road surface displacement $z_0$ representing the displacement of the road surface 55 in the vertical direction are the same. In different examples, similar preview vibration damping control may be executed by using the road surface displacement $z_0$ and/or the road surface displacement speed $dz_0$ in place of or in addition to the unsprung displacement $z_1$ and the unsprung speed $dz_1$. Notably, $z_0$ and $dz_0$ also assume positive values for upward displacements.

(Outline of Preview Vibration Damping Control for Front Wheels and Rear Wheels)

Next, the outline of the preview vibration damping control will be described for the front wheels and the rear wheels, respectively, with reference to FIGS. 5 to 7. For the "target control force Fct" and the "control force Fc," a suffix "F" represents that the target control force Fct and the control force Fc are those for the front wheel 11F, and a suffix "R" represents that the target control force Fct and the control force Fc are those for the rear wheel 11R.

Figure 5:
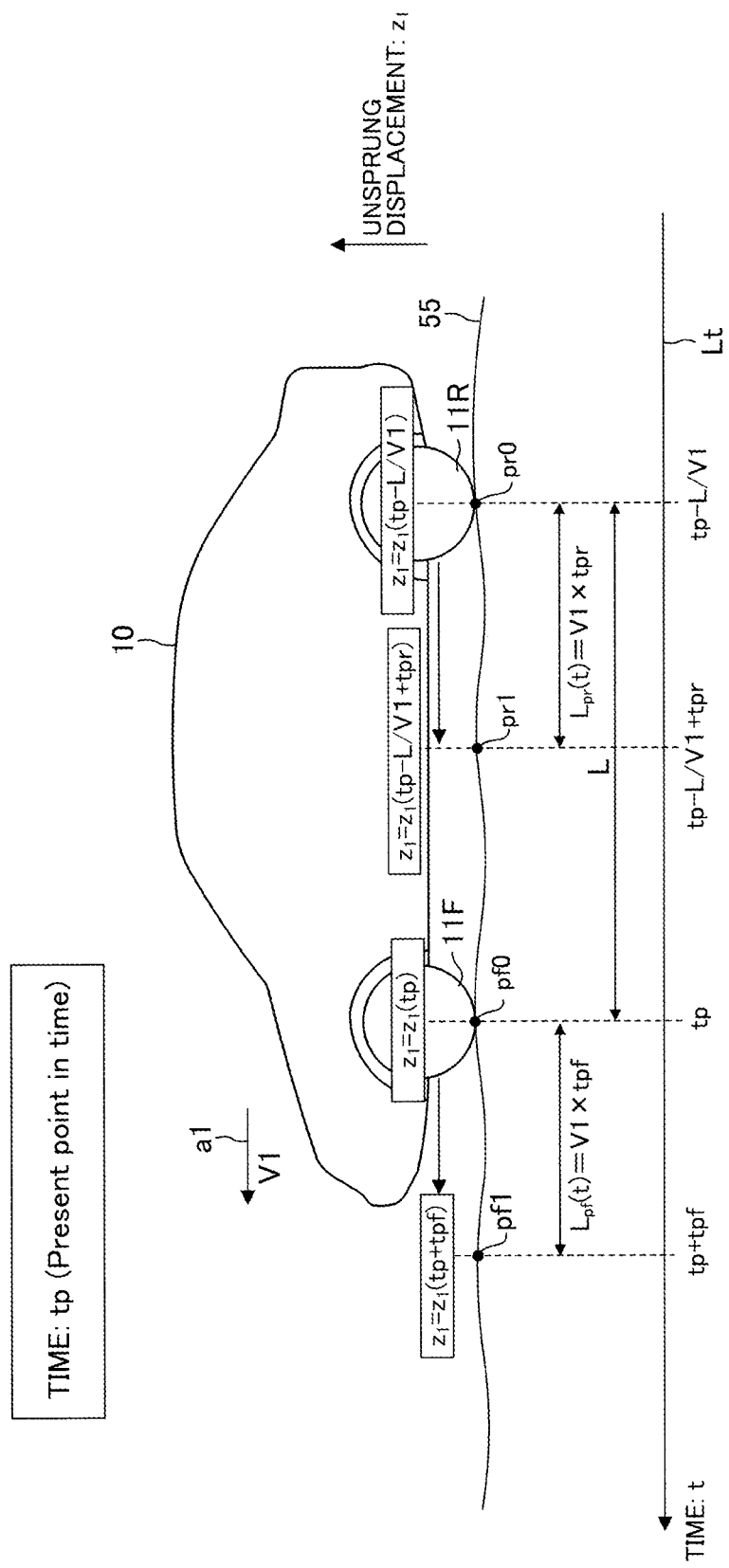
FIG. 5 is a chart used for describing preview vibration damping control.

FIG. 5 shows the vehicle 10 which is traveling at a speed V1 in a direction indicated by an arrow a1 at the present point in time tp. Notably, in the following description, the front wheel 11F and the rear wheel 11R are wheels on the left side or the right side, and the moving speeds of the front wheel 11F and the rear wheel 11R are considered to be the same as the speed V1.

In FIG. 5, a line Lt is a virtual time axis t. The unsprung displacement $z_1$ of the front wheel 11F on a moving route at time t at the present, in the past, and in the future is represented by a function $z_1(t)$ of time t. Therefore, the unsprung displacement $z_1$ of the front wheel 11F at a position (ground contact point) pf0 at the present point in time tp is represented as $z_1(tp)$. Furthermore, the unsprung displacement $z_1$ of the rear wheel 11R at a position pr0 at the present point in time tp is equal to the unsprung displacement $z_1$ of the front wheel 11F at a point in time "tp−L/V1" which is earlier than the present point in time tp by a time (L/V1) which the front wheel 11F took to move over a distance corresponding to a wheelbase L. Therefore, the unsprung displacement $z_1$ of the rear wheel 11R at the present point in time tp is represented as $z_1(tp-L/V1)$.

(Preview Vibration Damping Control for the Front Wheel 11F)

The ECU 30 computes a predicted route of the front wheel 11F. The predicted route of the front wheel 11F is a route that the front wheel 11F is predicted to pass. Next, the ECU 30 determines a predicted passage position pf1 of the front wheel 11F. The predicted passage position pf1 is a position that the front wheel 11F is predicted to pass after elapse of a front wheel advance read time tpf from the present point in time. The front wheel advance read time tpf is set in advance to a time which is necessary for the front wheel active actuator 17F to output the control force FcF corresponding to the target control force FctF after the ECU 30 has determined the predicted passage position pf1. The predicted passage position pf1 is apart from the position pf0 of the front wheel 11F at the present point in time tp by a front wheel advance read distance Lpf (=V1×tpf) along a predicted route of the front wheel 11F. As will be described later, the position pf0 is calculated on the basis of the present position of the vehicle 10 obtained by the position information obtaining device 32.

The ECU 30 previously obtains from the cloud 40 the road surface information map 43 for a region (preparation section, which will be described later) in the vicinity of the present position of the vehicle 10. The ECU 30 obtains an unsprung displacement $z_1(tp+tpf)$ on the basis of the predicted passage position pf1 and the road surface information map 43 obtained beforehand. More specifically, the ECU 30 obtains from the road surface information map 43 the unsprung displacement $(z_1)$ 43b at the predicted passage position pf1.

The ECU 30 computes the target control force FctF $(=\beta f \times z_1(tp+tpf))$ by applying the unsprung displacement $z_1(tp+tpf)$ to the unsprung displacement $z_1$ of the following expression (8).

$$FctF = \beta f \times z_1 \quad (8)$$

The ECU 30 transmits a control instruction containing the target control force FctF to the front wheel active actuator 17F such that the front wheel active actuator 17F generates a control force FcF corresponding to (equal to) the target control force FctF.

Figure 6:
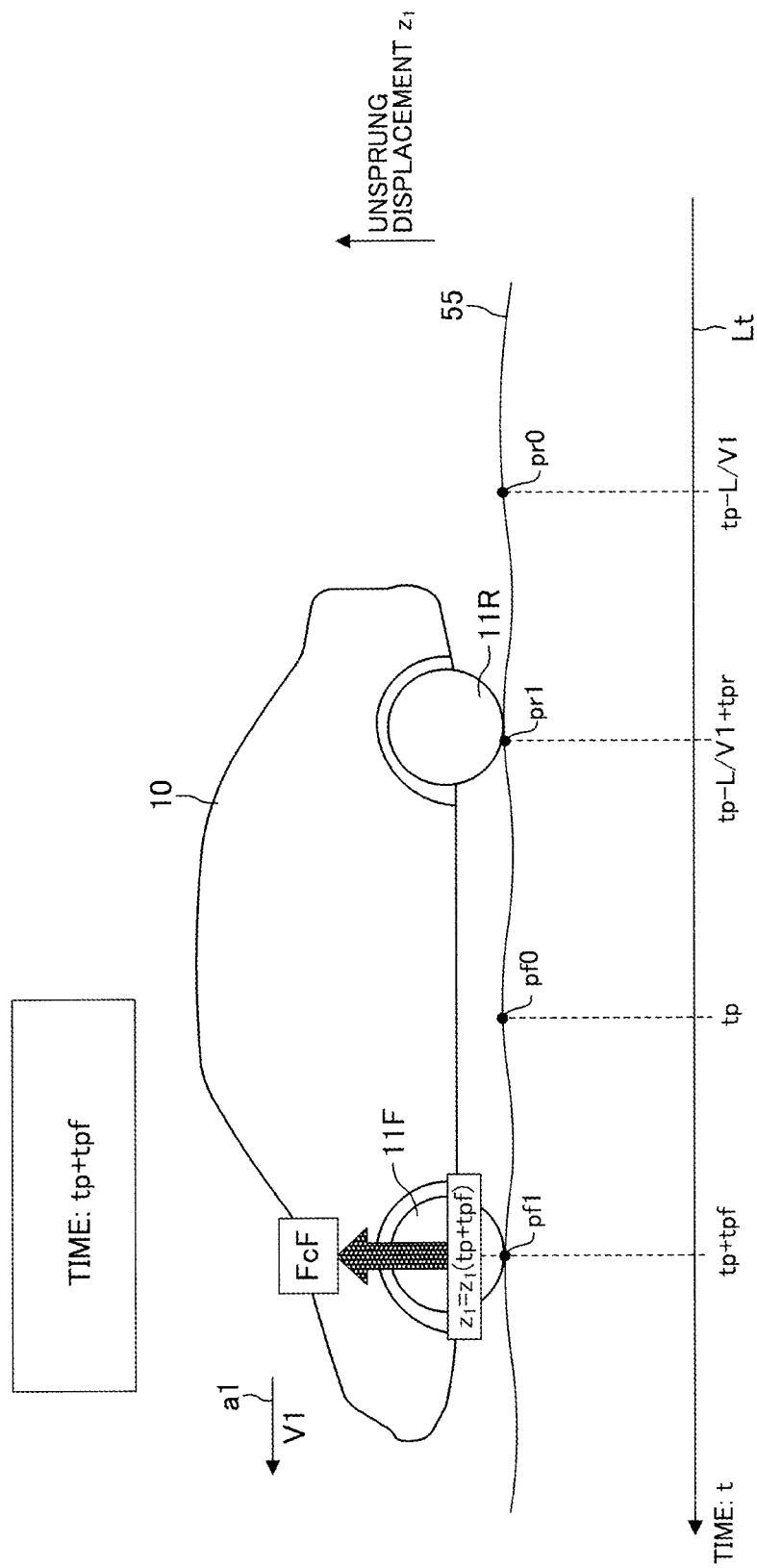
FIG. 6 is another chart used for describing the preview vibration damping control.

As shown in FIG. 6, the front wheel active actuator 17F generates the control force FcF corresponding to the target control force FctF at a point in time tp+tpf which is later than the present point in time tp by the front wheel advance read time tpF (namely, a timing when the front wheel 11F actually passes the predicted passage position pf1). Therefore, the front wheel active actuator 17F can generate at a proper timing the control force FcF which suppresses the vibration of the sprung portion 51 stemming from the unsprung displacement $z_1$ of the front wheel 11F at the predicted passage position pf1.

(Preview Vibration Damping Control for the Rear Wheel 11R)

The ECU 30 computes a predicted route of the rear wheel 11R. The predicted route of the rear wheel 11R is a route that the rear wheel 11R is predicted to pass. The ECU 30 computes the predicted route of the rear wheel 11R under the assumption that the rear wheel 11R follows the same route as the front wheel 11F. The ECU 30 may compute the predicted route of the rear wheel 11R by using the record of the position of the front wheel 11F.

As shown in FIG. 5, the ECU 30 determines a predicted passage position pr1 of the rear wheel 11R. The predicted passage position pr1 is a position that the rear wheel 11R is predicted to pass after elapse of a rear wheel advance read time tpr from the present point in time. The rear wheel advance read time tpr is set in advance to a time which is necessary for the rear wheel active actuator 17R to output a control force FcR corresponding to the target control force FctR after the ECU 30 has determined the predicted passage position pr1.

Notably, in the case where the front wheel active actuator 17F and the rear wheel active actuator 17R differ in response, the front wheel advance read time tpf and the rear wheel advance read time tpr are set to different values in advance. In the case where the front wheel active actuator 17F and the rear wheel active actuator 17R are the same in response, the front wheel advance read time tpf and the rear wheel advance read time tpr are set to the same value beforehand.

The ECU 30 determines, as the predicted passage position pr1, a position that is apart from the position pr0 of the rear wheel 11R at the present point in time tp by a rear wheel advance read distance Lpr (=V1×tpr) along the predicted route of the rear wheel 11R. The position pr0 is calculated on the basis of the present position of the vehicle 10 obtained by the position information obtaining device 32. Since the unsprung displacement $z_1$ at this predicted passage position pr1 is equal to the unsprung displacement $z_1$ at a point of time which is later, by the rear wheel advance read time tpr, than the "point in time (tp-L/V1) when the front wheel 11F was located at the position pr0 of the rear wheel 11R at the present point in time," the unsprung displacement $z_1$ at the predicted passage position pr1 can be represented as $z_1$(tp-L/V1+tpr). The ECU 30 obtains the unsprung displacement $z_1$(tp-L/V1+tpr) on the basis of the predicted passage position pr1 and the road surface information map 43 obtained beforehand. More specifically, the ECU 30 obtains, from the road surface information map 43, the unsprung displacement ($z_1$) 43b at the predicted passage position pr1.

Furthermore, the ECU 30 computes the target control force FctR (=βr×$z_1$(tp-L/V1+tpr)) by applying the unsprung displacement $z_1$(tp-L/V1+tpr) to the unsprung displacement $z_1$ of the following expression (9). Notably, the gain βf in expression (8) and the gain βr in expression (9) are set to values different from each other. This is because the spring constant Kf of the left front wheel suspension 13FL and the right front wheel suspension 13FR differs from the spring constant Kr of the left rear wheel suspension 13RL and the right rear wheel suspension 13RR.

$$FctR = \beta r \times z_1 \quad (9)$$

The ECU 30 transmits a control instruction containing the target control force FctR to the rear wheel active actuator 17R such that the rear wheel active actuator 17R generates a control force FcR corresponding to (equal to) the target control force FctR.

Figure 7:
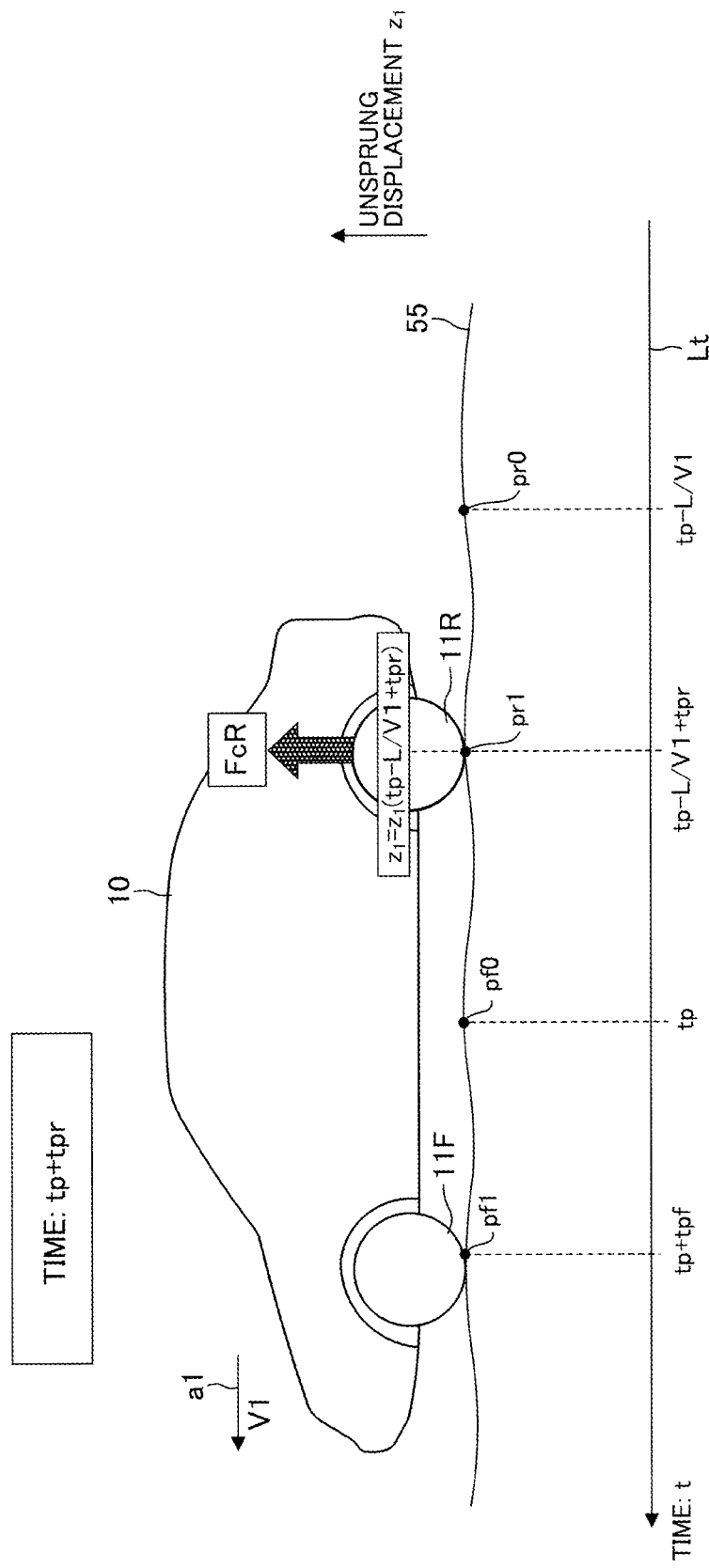
FIG. 7 is still another chart used for describing the preview vibration damping control.

As shown in FIG. 7, the rear wheel active actuator 17R generates the control force FcR corresponding to the target control force FctR at a point in time tp+tpr which is later than the present point in time tp by the rear wheel advance read time tpr (namely, a timing when the rear wheel 11R actually passes the predicted passage position pr1). Therefore, the rear wheel active actuator 17R can generate at a proper timing the control force FcR which suppresses the vibration of the sprung portion 51 stemming from the unsprung displacement $z_1$ of the rear wheel 11R at the predicted passage position pr1.

(Outline of Operation)

In the following description, a wheel 11 subjected to the preview vibration damping control will be referred to as the "wheel 11$i$." The suffix "i" represents any one of FL, FR, RL, and RR. Furthermore, the suffix "i" added to the reference numerals of other elements has the same meaning.

As described above, in the case where the magnitude of the road surface displacement $z_0$ falls outside the controllable range of the active actuator 17, the active actuator 17 outputs the maximum control force. In this case, since the active actuator 17 outputs the maximum control force despite that the effect of suppressing the vibration of the sprung portion 51 of the vehicle 10 is small, a problem of excess energy consumption by the active actuator 17 arises. Furthermore, in the case where the active actuator 17 continuously outputs the maximum control force, the active actuator 17 may suffer heat damage.

In view of the above, the ECU 30 operates as follows. The ECU 30 first computes the predicted route of the wheel 11$i$.

The predicted route of the wheel 11$i$ is a line which extends forward from the present position of the wheel 11$i$; specifically, a line which extends from the present position of the wheel 11$i$ in the heading direction of the vehicle 10 (in the present example, the direction of the azimuth angle θ) by a predetermined distance Dt. For example, the distance Dt may be equal to or shorter than a wheelbase L.

The ECU 30 previously obtains the road surface information map 43 for a preparation section from the cloud 40 and stores the road surface information map 43 in the RAM 30c. The preparation section is a section of a road which is located ahead of the vehicle 10 and which the vehicle 10 is predicted to pass later on. The preparation section is a section which is sufficiently large so that the predicted route of the wheel 11$i$ is contained in the preparation section.

The ECU 30 obtains, from the road surface information map 43, values of the unsprung displacement ($z_1$) 43b on the predicted route of the wheel 11$i$. The set of the values of the unsprung displacement ($z_1$) 43b obtained in this manner represents a time series change of the unsprung displacement $z_1$ on the predicted route of the wheel 11$i$, and, hereinafter, will be referred to as the "first time series change data of the unsprung displacement $z_1$."

The ECU 30 determines whether or not a predetermined first condition is satisfied on the basis of the first time series change data of the unsprung displacement $z_1$. The first condition is a condition for determining whether or not the time series change of the unsprung displacement $z_1$ on the predicted route of the wheel 11$i$ falls within the controllable range of the active actuator 17$i$. In the present example, the active actuator 17$i$ can move its moving part in a range between $-z_{1\_r0}$ and $z_{1\_r0}$ in the vertical direction. $z_{1\_r0}$ is a positive constant.

The first condition is satisfied when the maximum value $z_{1\_max1}$ of the magnitude (absolute value) of the unsprung displacement $z_1$ in the first time series change data of the unsprung displacement $z_1$ is equal to or less than a first threshold Th1. The first threshold Th1 is set on the basis of the controllable range of the active actuator 17$i$. In the present example, the first threshold Th1 is $z_{1\_r0}$.

Notably, the first threshold Th1 is not limited thereto. For example, the first threshold Th1 may be smaller than $z_{1\_r0}$. In another example case where a determination is made as to whether or not the unsprung displacement $z_1$ on the predicted route deviates greatly from the controllable range of the active actuator 17$i$, the first threshold Th1 may be set to a value larger than $z_{1\_r0}$.

In the case where the first condition is not satisfied, this means that the time series change of the unsprung displacement $z_1$ on the predicted route of the wheel 11$i$ falls outside the controllable range of the active actuator 17$i$. Accordingly, the ECU 30 executes a process for reducing the magnitude (absolute value) of "the unsprung displacement $z_1$ at the predicted passage position" used for computation of the target control force Fcti. In the following description, such a process will be referred to as the "first particular process."

In the first particular process of the present example, the ECU 30 executes a high-pass filter process (hereinafter, referred to as the "HPF process") on the first time series change data of the unsprung displacement $z_1$. The HPF process is a process for attenuating or removing components in a frequency band lower than a first cutoff frequency fc1. As to a waveform represented by the first time series change data of the unsprung displacement $z_1$, the amplitudes of components in a low frequency band tends to be large. The ECU 30 can reduce (limit) the magnitude of the unsprung displacement $z_1$ at the predicted passage position of the wheel $11i$ to fall within the controllable range of the active actuator $17i$ (the range of $-z_{1\_r0}$ to $z_{1\_r0}$) by attenuating or removing the components in the low frequency band through the HPF process. Notably, the first cutoff frequency fc1 of the HPF process may be set to, for example, a frequency lower than the resonance frequency of the sprung portion.

The ECU 30 obtains the unsprung displacement $z_1$ at the predicted passage position of the wheel $11i$ from the "first time series change data of the unsprung displacement $z_1$" having been subjected to the HPF process. The ECU 30 computes the target control force Fcti by using the obtained unsprung displacement $z_1$.

Notably, in the case where the first condition is satisfied, the ECU 30 obtains the unsprung displacement $z_1$ at the predicted passage position of the wheel $11i$ from the first time series change data of the unsprung displacement $z_1$ without executing the first particular process. The ECU 30 computes the target control force Fcti by using the obtained unsprung displacement $z_1$.

By virtue of the above-described configuration, in the case where the time series change of the unsprung displacement $z_1$ on the predicted route of the wheel $11i$ falls outside the controllable range of the active actuator $17i$, the ECU 30 can reduce the magnitude of the unsprung displacement $z_1$ at the predicted passage position by executing the first particular process (HPF process). As a result, the magnitude of the unsprung displacement $z_1$ at the predicted passage position can be reduced to fall within the controllable range of the active actuator $17i$. Accordingly, it is possible to reduce the possibility that excess energy is consumed by the active actuator $17i$. Furthermore, since the first particular process is a process for attenuating or removing vibrations in a low frequency band, the ECU 30 can suppress vibrations in a high frequency band higher than the first cutoff frequency fc1. It is possible to suppress vibrations in the high frequency band, while reducing the possibility that excess energy is consumed by the active actuator $17i$.

(Vibration Damping Control Routine)

Every time a predetermined time elapses, the CPU of the ECU 30 (hereinafter referred to as the "CPU1") executes a vibration damping control routine shown in FIG. 8. The CPU1 executes the vibration damping control routine for each of the wheels 11. As in the above description, a wheel 11 for which the vibration damping control routine is executed will be referred to as the "wheel $11i$."

Notably, by executing an unillustrated routine every time a predetermined time elapses, the CPU1 previously obtains the road surface information map 43 for the preparation section from the cloud 40 and temporarily stores the road surface information map 43 in the RAM 30c.

Figure 8:
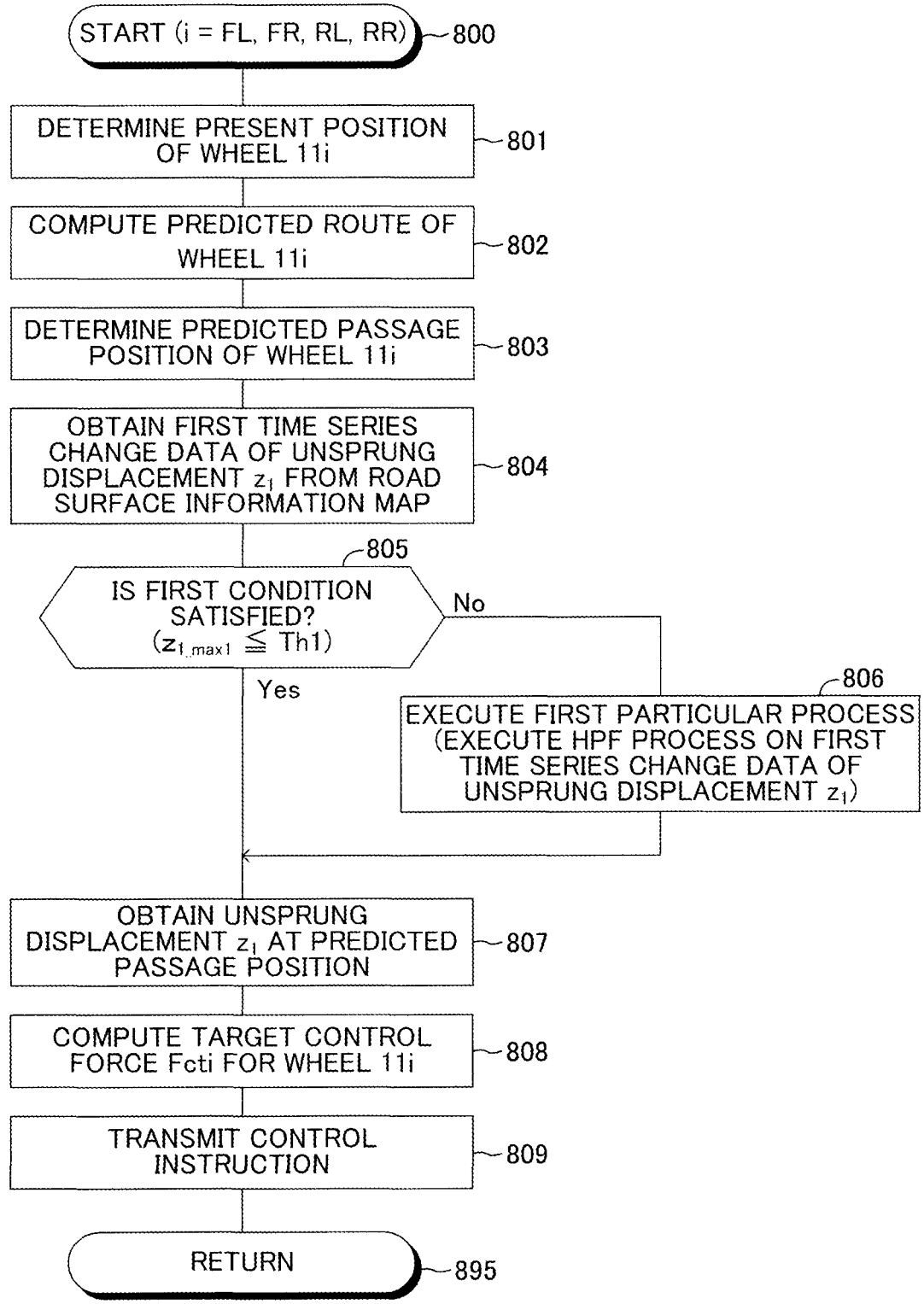
FIG. 8 is a flowchart representing a "vibration damping control routine" executed by a CPU of an electronic controller according to the embodiment.

When a predetermined timing has come, the CPU1 starts the process from step 800 of FIG. 8, executes step 801 to step 804 in this order, and then proceeds to step 805.

Step 801: The CPU1 determines the present position of the wheel $11i$. Specifically, the CPU1 obtains, from the position information obtaining device 32, the present position of the vehicle 10 and the azimuth angle θ representing the heading direction of the vehicle 10. Positional relationship data representing the relationship between the position of each wheel 11 and the mounting position of the GNSS receiver in the vehicle 10 are stored in the ROM 30b of the ECU 30 beforehand. The present position of the vehicle 10 obtained from the position information obtaining device 32 corresponds to the mounting position of the GNSS receiver. Accordingly, the CPU1 determines the present position of the wheel $11i$ on the basis of the present position of the vehicle 10, the azimuth angle θ of the vehicle 10, and the above-described positional relationship data.

Step 802: The CPU1 determines a predicted route of the wheel $11i$ in a manner described above. In the case where the wheel $11i$ is the front wheel 11F, the CPU1 computes, as the predicted route, a line which extends forward from the present position of the wheel $11i$ by a distance Dt in the heading direction of the vehicle 10 (the direction of the azimuth angle θ). In the case where the wheel $11i$ is the rear wheel 11R, the CPU1 computes a predicted route under the assumption that the rear wheel 11R follows the same route as the front wheel 11F.

Step 803: The CPU1 determines a predicted passage position of the wheel $11i$. In the case where the wheel $11i$ is the front wheel 11F, the CPU1 computes the front wheel advance read distance Lpf by multiplying the vehicle speed Vs by the front wheel advance read time tpf. Furthermore, the CPU1 determines, as the predicted passage position pf1, a position that is shifted forward from the present position of the front wheel 11R by the front wheel advance read distance Lpf along the predicted route. In the case where the wheel $11i$ is the rear wheel 11R, the CPU1 computes the rear wheel advance read distance Lpr by multiplying the vehicle speed Vs by the rear wheel advance read time tpr. Furthermore, the CPU1 determines, as the predicted passage position pr1, a position that is shifted forward from the present position of the rear wheel 11R by the rear wheel advance read distance Lpr along the predicted route.

Step 804: The CPU1 obtains the first time series change data of the unsprung displacement $z_1$ (the set of values of the unsprung displacement $z_1$ on the predicted route of the wheel $11i$) from the road surface information map 43 stored in the RAM 30c.

When the CPU1 proceeds to step 805, the CPU1 determines whether or not the above-described first condition is satisfied. In the case where the first condition is satisfied, the CPU1 makes a "Yes" determination in step 805 and executes step 807 to step 809, which will be described below, in this order. Subsequently, the CPU1 proceeds to step 895 so as to end the current execution of the present routine.

Step 807: The CPU1 obtains the unsprung displacement $z_1$ at the predicted passage position of the wheel $11i$ from the first time series change data of the unsprung displacement $z_1$.

Step 808: As described above, the CPU1 computes the target control force Fcti by using the unsprung displacement $z_1$ obtained in step 807. In the case where the wheel $11i$ is the front wheel 11F, the CPU1 computes the target control force Fcti by applying the unsprung displacement $z_1$ obtained in step 807 to expression (8). In the case where the wheel $11i$ is the rear wheel 11R, the CPU1 computes the target control force Fcti by applying the unsprung displacement $z_1$ obtained in step 807 to expression (9).

Step 809: The CPU1 transmits a control instruction containing the target control force Fcti to the active actuator $17i$ corresponding to the wheel $11i$.

Meanwhile, in the case where the first condition is not satisfied, the CPU1 makes a "No" determination in step 805 and proceeds to step 806 so as to execute the first particular process. Namely, the CPU1 executes the HPF process on the first time series change data of the unsprung displacement $z_1$. Subsequently, the CPU1 executes step 807 to step 809 in this order as described above, and then proceeds to step 895 so as to end the current execution of the present routine. Notably, in this case, in step 807, the CPU1 obtains the unsprung displacement $z_1$ at the predicted passage position of the wheel $11i$ from "the first time series change data of the unsprung displacement $z_1$" on which the first particular process has been executed.

As can be understood from the above, in the case where the time series change of the unsprung displacement $z_1$ on the predicted route of the wheel $11i$ falls outside the controllable range of the active actuator $17i$, the vibration damping control apparatus 20 executes the first particular process (HPF process). As a result, it is possible to reduce the magnitude of the unsprung displacement $z_1$ at the predicted passage position of the wheel $11i$ so that the magnitude of the unsprung displacement $z_1$ falls within the controllable range of the active actuator $17i$. Accordingly, it is possible to reduce the possibility that excess energy is consumed by the active actuator $17i$. Furthermore, it is possible to prevent the active actuator $17i$ from suffering heat damage.

(Configuration of Data Management System)

Figure 9:
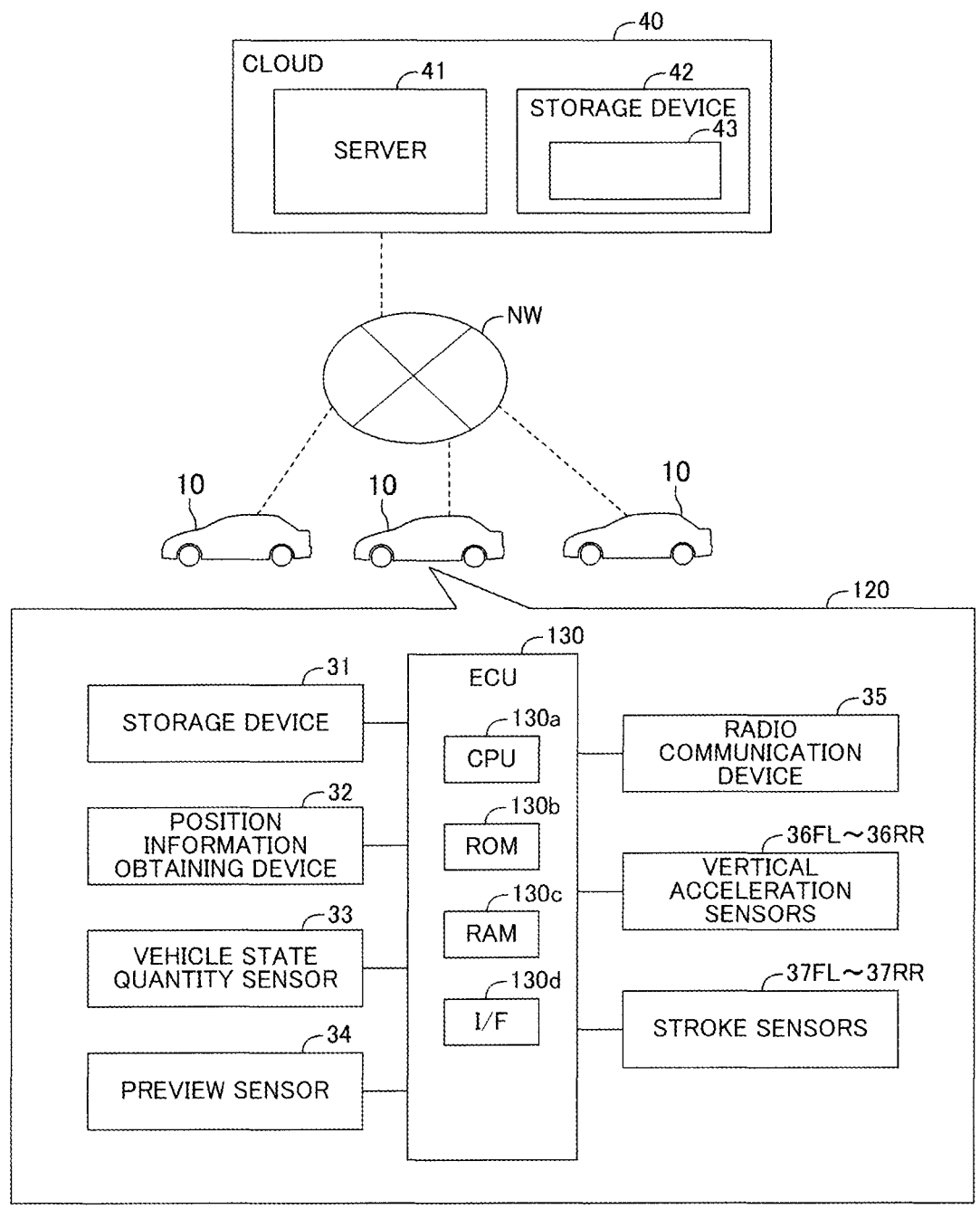
FIG. 9 is a schematic diagram of a data management system according to the embodiment.

A data management system according to the embodiment is a system for creating the road surface information map 43. As shown in FIG. 9, the data management system includes a plurality of vehicles (in the present example, a plurality of vehicles 10) and the cloud 40.

Each vehicle 10 includes a data collection device 120. The data collection device 120 includes an electronic controller 130 (hereinafter referred to as the "ECU 130"), a storage device 31, a position information obtaining device 32, a vehicle state quantity sensor 33, a preview sensor 34, a radio communication device 35, vertical acceleration sensors 36FL to 36RR, and stroke sensors 37FL to 37RR.

The ECU 130 includes a microcomputer containing a CPU 130a, a ROM 130b, a RAM 130c, an interface (I/F) 130d, etc. The ECU 130 is connected to the storage device 31, the position information obtaining device 32, the vehicle state quantity sensor 33, the preview sensor 34, and the radio communication device 35. Since the configurations of these devices and sensors have already been described, their detailed descriptions will not be repeated.

Furthermore, the ECU 130 is connected to the vertical acceleration sensors 36FL to 36RR and the stroke sensors 37FL to 37RR and receives signals output from these sensors.

The vertical acceleration sensors 36FL to 36RR detect vertical accelerations (sprung accelerations $ddz_2FL$ to $ddz_2RR$) of the body 10a (the sprung portion 51) at the positions of the wheels 11FL to 11RR and output signals representing the vertical accelerations. Notably, the vertical acceleration sensors 36FL to 36RR will be referred to as the "vertical acceleration sensor(s) 36" in the case where they are not required to be distinguished from one another. Similarly, the sprung accelerations $ddz_2FL$ to $ddz_2RR$ will be referred to as the "sprung acceleration(s) $ddz_2$."

The stroke sensors 37FL to 37RR are provided for the suspensions 13FL to 13RR, respectively. The stroke sensors 37FL to 37RR respectively detect the vertical strokes Hfl to Hrr of the suspensions 13FL to 13RR and output signals representing the vertical strokes. The strokes Hfl to Hrr are vertical strokes of the wheel support members 12FL to 12RR (unsprung portion 50) in relation to the body 10a (the sprung portion 51) at the positions of the wheels 11 shown in FIG. 1. Notably, the stroke sensors 37FL to 37RR will be referred to as the "stroke sensor(s) 37" in the case where they are not required to be distinguished from one another. Similarly, the strokes Hfl to Hrr will be referred to as the "stroke(s) H."

The ECU 130 determines the present position of each wheel 11 by referring to the present position of the vehicle 10, the heading direction (azimuth angle θ) of the vehicle 10, and the above-described positional relationship data. Furthermore, the ECU 130 obtains the sprung acceleration $ddz_2$ from each of the vertical acceleration sensors 36 and obtains the stroke H from each of the stroke sensors 37.

The ECU 130 transmits a predetermined time series data (hereinafter referred to as "sensing data") to the server 41 via the radio communication device 35. The sensing data includes time series data of the position of the wheel 11, time series data of the sprung acceleration $ddz_2$, and time series data of the stroke H. Notably, in the sensing data, the position of the wheel 11, the sprung acceleration $ddz_2$, and the stroke H are added with pieces of information representing times when these values were detected.

(Data Creation Routine)

Every time a predetermined time elapses, the CPU of the server 41 (hereinafter referred to as the "CPU2") executes a data creation routine shown by a flowchart in FIG. 10.

Notably, by executing an unillustrated routine every time a predetermined time elapses, the CPU2 receives sensing data from each of the plurality of vehicles 10 and accumulates the received sensing data in the storage device 42.

Figure 10:
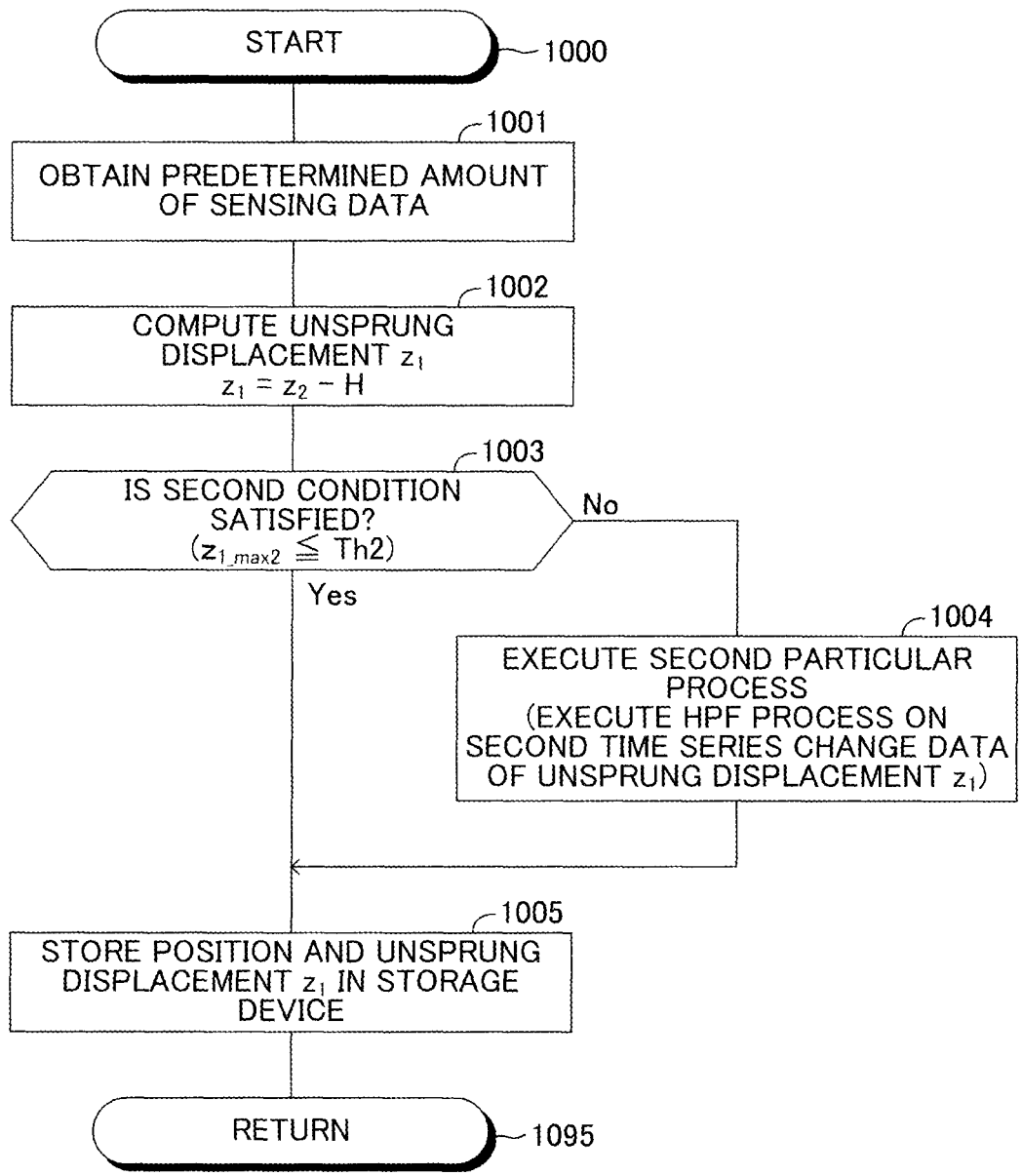
FIG. 10 is a flowchart representing a "data creation routine" executed by a CPU of a server according to the embodiment.

When a predetermined timing has come, the CPU2 starts the process from step 1000 of FIG. 10, executes step 1001 and step 1002 in this order, and then proceeds to step 1003.

Step 1001: The CPU2 obtains a predetermined amount of sensing data from the storage device 42.

Step 1002: The CPU2 produces time series data of the unsprung displacement $z_1$ by subtracting the stroke H from the sprung displacement $z_2$. The data produced in this step will be referred to as the "second time series change data of the unsprung displacement $z_1$."

More specifically, the CPU2 produces time series data of the sprung displacement $z_2$ by executing a second-order integration process on the time series data of the sprung acceleration $ddz_2$. The CPU2 executes a band-pass filter process (hereinafter referred to as the "BPF process") on the time series data of the sprung displacement $z_2$. The BPF process allows passage of only components in a particular frequency band. In the present example, the particular frequency band ranges from a predetermined lower limit cutoff frequency to a predetermined upper limit cutoff frequency. Furthermore, the CPU2 executes the above-described BPF process on the time series data of the stroke H.

In the present example, the BPF process is performed by a zero-phase filter process. For example, the CPU2 performs on the time series data of the sprung displacements $z_2$ both a process performed in the forward direction on the time axis (a BPF process in which the time series data is processed from the first value toward the last value) and a process performed in the backward direction on the time axis (a BPF process in which the time series data is processed from the last value toward the first value), and adds the results of the processes together for averaging. It is known that, in such a zero-phase filter process, phase delay due to filtering does not occur. Notably, the BPF process may be performed by using FFT (Fast Fourier Transform).

The CPU2 produces second time series change data of the unsprung displacement $z_1$ by subtracting the BPF processed stroke H from the BPF processed sprung displacement $z_2$.

When the CPU2 proceeds to step 1003, the CPU2 determines whether or not a predetermined second condition is satisfied on the basis of the second time series change data of the unsprung displacement $z_1$. The second condition is a condition for determining whether or not the time series change of the unsprung displacement $z_1$ in the second time series change data of the unsprung displacement $z_1$ falls within the controllable range of a general active actuator. In the present example, it is assumed that the general active actuator can move its movable part in the vertical direction within a range of $-z_{1\_r1}$ to $z_{1\_r1}$. $z_{1\_r1}$ is a positive constant.

The second condition is satisfied when the maximum value $z_{1\_max2}$ of the magnitude (absolute value) of the unsprung displacement $z_1$ in the second time series change data of the unsprung displacement $z_1$ is equal to or less than a second threshold Th2. In the present example, the second threshold Th2 is $z_{1\_r1}$.

In the case where the second condition is satisfied, the CPU2 makes a "Yes" determination in step 1003 and proceeds to step 1005. In step 1005, the CPU2 establishes a relationship between the time series data of the position of the wheel 11 and the second time series change data of the unsprung displacement $z_1$. Subsequently, the CPU2 stores the combination of the position of the wheel 11 and the unsprung displacement $z_1$ in the storage device 42 as the road surface information map 43. Subsequently, the CPU2 proceeds to step 1095 so as to end the current execution of the present routine.

Meanwhile, in the case where the second condition is not satisfied, the CPU2 makes a "No" determination in step 1003 and proceeds to step 1004. In step 1004, the CPU2 executes a process of reducing the magnitude (absolute value) of the unsprung displacement $z_1$. In the following description, such a process will be referred to as the "second particular process." Specifically, the CPU2 executes an HPF process on the second time series change data of the unsprung displacement $z_1$. Notably, the second cutoff frequency fc2 of the HPF process in the second particular process is set a frequency which is higher than the lower limit cutoff frequency of the BPF process executed in step 1002. After that, the CPU2 executes the process of step 1005 as described above and proceeds to step 1095 so as to end the current execution of the present routine.

By virtue of this configuration, in the case where the server 41 provides the road surface information map 43 to the vehicle 10, it is possible to reduce the possibility that the magnitude of the unsprung displacement ($z_1$) 43b in the road surface information map 43 falls outside the controllable range of the active actuator 17 mounted on the vehicle 10. Furthermore, since the server 41 creates the road surface information map 43 in conformity with the controllable range (the range of $-z_{1\_r1}$ to $z_{1\_r1}$) of the general active actuator, the server 41 allows a large number of vehicles 10 to yield the above-described effect.

The present disclosure is not limited to the above-described embodiment, and various modifications can be employed within the range of the present disclosure.
(First Modification)

The first particular process is not limited to the above-described example. The first particular process may be other processes so long as a process used can reduce the magnitude (absolute value) of the unsprung displacement $z_1$ at the predicted passage position of the wheel 11i. In the case where the first condition is not satisfied, the CPU1 may set the gain for the unsprung displacement $z_1$ in the expression for computing the target control force Fcti to be smaller as compared with the case where the first condition is satisfied. Specifically, in the case where the first condition is satisfied, in step 808, the CPU1 computes the target control force Fcti in accordance with the following expression (10), where βi is a gain set for each wheel 11i (on a wheel by wheel basis).

$$Fcti = \beta i \times z_1 \quad (10)$$

Meanwhile, in the case where the first condition is not satisfied, in step 808, the CPU1 computes the target control force Fcti in accordance with the following expression (11), where βi' is a gain set for each wheel 11i (on a wheel by wheel basis). The gain βi' of expression (11) is smaller than the gain βi of expression (10).

$$Fcti = \beta i' \times z_1 \quad (11)$$

As described above, the CPU1 may execute, as the first particular process, a gain changing process for reducing the gain for the unsprung displacement $z_1$ at the predicted passage position of the wheel 11i. As a result, the magnitude of the unsprung displacement $z_1$ at the predicted passage position can be limited to fall within the controllable range $(-z_{1\_r0}$ to $z_{1\_r0})$ of the active actuator 17i. In a certain example, the CPU1 may execute only the gain changing process without executing the HPF process. In another example, the CPU1 may execute both the HPF process and the gain changing process.
(Second Modification)

The CPU1 may compute a "first index value which represents the degree of deviation of the unsprung displacement $z_1$ on the predicted route from the controllable range of the active actuator 17i." In the first particular process, the CPU1 may execute a process for reducing the magnitude of the unsprung displacement $z_1$ at the predicted passage position of the wheel 11i to a degree that increases with the first index value. For example, the CPU1 computes, as the first index value, the difference (hereinafter referred to as the "first difference value") between the first threshold Th1 and the maximum value $z_{1\_max1}$ obtained from the first time series change data of the unsprung displacement $z_1$. The CPU1 may reduce the magnitude of the unsprung displacement $z_1$ at the predicted passage position of the wheel 11i in accordance with the first difference value. For example, in the case where the first difference value is greater than a predetermined value, the CPU1 may set the cutoff frequency of the HPF process to a frequency fc1' which is higher than the first cutoff frequency fc1. In a different example, in the case where the first difference value is greater than the predetermined value, the CPU1 may increase the degree of attenuation of components in a frequency band lower than the first cutoff frequency fc1 by changing the order of the HPF process. Furthermore, the CPU1 may execute in parallel a plurality of HPF processes, having different cutoff frequencies or different orders, on the first time series change data of the unsprung displacement $z_1$, thereby creating two sets of "the first time series change data of the unsprung displacement $z_1$." The CPU1 may compute the weighted sum of these sets. The CPU1 may adjust the weights of the elements in the weighted sum in accordance with the first difference value. Notably, the first index value is not limited to the first difference value. Other values, such as the amplitude of the unsprung displacement $z_1$ in the first time series change data of the unsprung displacement $z_1$ may be employed as the first index value. Notably, the CPU1 may reduce the gain βi' of expression (11) in accordance with the first index value.
(Third Modification)

In the above-described embodiment, the active actuator 17 is used as a control force generating apparatus. However, the control force generating apparatus is not limited thereto. Namely, the control force generating apparatus may be any actuator which can adjustably generate a control force in the vertical direction for damping the vibration of the sprung portion 51, on the basis of a control instruction containing the target control force.

Furthermore, the control force generating apparatus may be an active stabilizer apparatus (not shown). The active stabilizer apparatus includes a front wheel active stabilizer and a rear wheel active stabilizer. When the front wheel active stabilizer generates a control force (left front wheel control force) in the vertical direction between the sprung portion 51 and the unsprung portion 50 which correspond to the left front wheel 11FL, the front wheel active stabilizer generates a control force (right front wheel control force), in the direction opposite the left front wheel control force, between the sprung portion 51 and the unsprung portion 50 which correspond to the right front wheel 11FR. Similarly, when the rear wheel active stabilizer generates a control force (left rear wheel control force) in the vertical direction between the sprung portion 51 and the unsprung portion 50 which correspond to the left rear wheel 11RL, the rear wheel active stabilizer generates a control force (right rear wheel control force), in the direction opposite the left rear wheel control force, between the sprung portion 51 and the unsprung portion 50 which correspond to the right rear wheel 11RR. The structure of the above-described active stabilizer apparatus is well known and is incorporated into the specification of the present application by referring to Japanese Patent Application Laid-Open (kokai) No. 2009-96366. Notably, it is sufficient that the active stabilizer apparatus includes at least one of the front wheel active stabilizer and the rear wheel active stabilizer.

The control force generating apparatus may be an apparatus which generates the control force Fc in the vertical direction by utilizing the geometry of the suspensions 13FL to 13RR; specifically, by increasing and decreasing braking and driving forces applied to the wheels 11 of the vehicle 10. The structure of such an apparatus is well known and is incorporated into the specification of the present application by referring to Japanese Patent Application Laid-Open (kokai) No. 2016-107778, etc. The ECU 30 computes the braking and driving forces for generating the control force Fc corresponding to the target control force Fct by a well known method.

Such an apparatus includes a drive apparatus (for example, in-wheel motors) for applying drive forces to the wheels 11 and a braking apparatus for applying braking forces to the wheels 11. Notably, the drive apparatus may be a motor, an engine, or the like which applies drive forces to the front wheels, the rear wheels, or the four wheels. Furthermore, it is sufficient that the control force generating apparatus includes at least one of the drive apparatus and the braking apparatus.

Alternatively, the control force generating apparatus may be damping-force-variable type shock absorbers 15FL to 15RR. In this case, the ECU 30 controls the damping coefficients C of the shock absorbers 15FL to 15RR in such a manner that the damping forces of the shock absorbers 15FL to 15RR change by an amount corresponding to the target control force Fct.

(Fourth Modification)

For example, the vehicle 10 includes, as the control force generating apparatus, an active stabilizer apparatus in addition to the active actuator 17. In this configuration, the CPU1 may execute the following process. For example, it is assumed that the wheels 11$i$ are the front wheels 11F. In this case, in step 802, the CPU1 computes a predicted route of the left front wheel 11FL and a predicted route of the right front wheel 11FR. In step 804, the CPU1 obtains the first time series change data of the unsprung displacement $z_1$ for the left front wheel 11FL and the first time series change data of the unsprung displacement $z_1$ for the right front wheel 11FR. In the following description, a waveform represented by the first time series change data of the unsprung displacement $z_1$ for the left front wheel 11FL will be referred to as the "first waveform," and a waveform represented by the first time series change data of the unsprung displacement $z_1$ for the right front wheel 11FR will be referred to as the "second waveform."

The active stabilizer apparatus is an apparatus which imparts a difference in the vertical direction between the left front wheel 11FL and the right front wheel 11FR. In the case where the first waveform and the second waveform are in anti-phase relative to each other, the CPU1 can drive the active stabilizer apparatus so as to suppress the vibration of the sprung portion 51. Accordingly, in the case where the first waveform and the second waveform are in anti-phase relative to each other, the controllable range of the active stabilizer apparatus is wide from the viewpoint of suppressing the vibration of the sprung portion 51. Meanwhile, in the case where the first waveform and the second waveform are in phase relative to each other, even when the active stabilizer apparatus is driven, the effect of suppressing the vibration of the sprung portion 51 is small. Accordingly, in the case where the first waveform and the second waveform are in phase relative to each other, the controllable range of the active stabilizer apparatus is narrow from the viewpoint of suppressing the vibration of the sprung portion 51.

In consideration of the above, in the case where the first waveform and the second waveform are in phase relative to each other, the CPU1 sets the first threshold Th1 in the first condition to a first value Th1$a$. The first value Th1$a$ is set in consideration of the case where the first waveform and the second waveform are in phase relative to each other. In the case where the first waveform and the second waveform are in anti-phase relative to each other, the CPU1 sets the first threshold Th1 in the first condition to a second value Th1$b$. The second value Th1$b$ is larger than the first value Th1$a$. By virtue of this configuration, the CPU1 can change the first threshold Th1 in the first condition to a proper value in accordance with whether the first waveform and the second waveform are in phase or in anti-phase.

(Fifth Modification)

The CPU2 may compute a "second index value which represents the degree of deviation of the unsprung displacement $z_1$ in the second time series change data from the controllable range of a general active actuator." In the second particular process, the CPU2 may execute a process for reducing the magnitude of the unsprung displacement $z_1$ to a degree that increases with the second index value. For example, the CPU2 computes, as the second index value, the difference (hereinafter referred to as the "second difference value") between the second threshold Th2 and the maximum value $z_{1\_max2}$ obtained from the second time series change data of the unsprung displacement $z_1$. The CPU2 may reduce the magnitude of the unsprung displacement $z_1$ in accordance with the second difference value. For example, in the case where the second difference value is greater than a predetermined value, the CPU2 may set the cutoff frequency of the HPF process to a frequency fc2' which is higher than the second cutoff frequency fc2. In a different example, in the case where the second difference value is greater than the predetermined value, the CPU2 may increase the degree of attenuation of components in a frequency band lower than the second cutoff frequency fc2 by changing the order of the HPF process. Furthermore, the CPU2 may execute in parallel a plurality of HPF processes, having different cutoff frequencies or different orders, on the second time series change data of the unsprung displacement $z_1$, thereby creating two sets of "the second time series change data of the unsprung displacement $z_1$." The CPU2 may compute the weighted sum of these sets. The CPU2 may adjust the weights of the elements in the weighted sum in accordance with the second difference value. Notably, the second index value is not limited to the second difference value. Other values, such as the amplitude of the unsprung displacement $z_1$ in the second time series change data of the unsprung displacement $z_1$ may be employed as the second index value.

(Sixth Modification)

As described above, in the case where the first waveform and the second waveform are in anti-phase relative to each other, the controllable range of the active stabilizer apparatus is wide from the viewpoint of suppressing the vibration of the sprung portion 51. Meanwhile, in the case where the first waveform and the second waveform are in phase relative to each other, the controllable range of the active stabilizer apparatus is narrow from the viewpoint of suppressing the vibration of the sprung portion 51. In consideration of this, the CPU2 may create a road surface information map 43 for the case where the first waveform and the second waveform are in phase and a road surface information map 43 for the case where the first waveform and the second waveform are in anti-phase. The range of the unsprung displacement (z1) 44b in the road surface information map 43 for the case where the first waveform and the second waveform are in anti-phase is wider than the range of the unsprung displacement (z1) 44b in the road surface information map 43 for the case where the first waveform and the second waveform are in phase. For example, the CPU2 may create, by changing the second threshold Th2 of the second condition, the road surface information map 43 for the case where the first waveform and the second waveform are in phase and the road surface information map 43 for the case where the first waveform and the second waveform are in anti-phase.

(Seventh Modification)

The CPU2 of the server 41 may execute a process of estimating both or either of the unsprung displacement $z_1$ and the unsprung speed $dz_1$ by using an observer. The CPU2 may produce the time series data of the road surface displacement $z_0$ by executing a zero-phase filter process on the time series data of the road surface displacement $z_0$ detected by the preview sensor 34 as described above. Furthermore, the CPU2 may produce the time series data of the road surface displacement speed $dz_0$ by executing a differential process and a zero-phase filter process on the time series data of the road surface displacement $z_0$. Accordingly, the CPU2 may store at least one of the road surface displacement $z_0$, the road surface displacement speed $dz_0$, the unsprung displacement $z_1$, and the unsprung speed $dz_1$ in the storage device 42 as the road surface displacement related value 43b of the road surface information map 43.

(Eighth Modification]

The road surface information map 43 may be stored in the storage device 31 of the vehicle 10 instead of being stored in the storage device 42 of the cloud 40. The ECU 130 may have the function of the server 41. The ECU 130 may create the road surface information map 43 in the storage device 31 by executing the process of the routine of FIG. 10.

(Ninth Modification)

The suspensions 13FL to 13RR may be suspensions of any type so long as the suspensions allow vertical displacements of the wheels 11FL to 11RR in relation to the body 10a. Furthermore, the suspension springs 16FL to 16RR may be springs of any type such as compression coil springs, air springs, etc.

What is claimed is:

1. A control method for controlling a vehicle which includes a control force generating apparatus configured to generate control force in a vertical direction for damping vibration of a sprung portion of the vehicle, the control force being applied between at least one wheel and a portion of a body of the vehicle, which portion corresponds to a position of the wheel, and a control unit for controlling the control force generating apparatus, the control method comprising:
a step in which the control unit computes a predicted route that the wheel is predicted to pass;
a step in which the control unit obtains first data from road surface information which is data in which a relationship is established between position information representing a position on a road surface and a road surface displacement related value which relates to a vertical displacement of the road surface at the position represented by the position information, the first data representing a time series change of the road surface displacement related value on the predicted route;
a step in which the control unit obtains, from the first data, the road surface displacement related value at a predicted passage position that the wheel is predicted to pass when a predetermined time elapses from a present point in time;
a step in which the control unit computes a target control force by using the road surface displacement related value at the predicted passage position; and
a step in which the control unit executes preview vibration damping control for controlling the control force generating apparatus in such a manner that the control force becomes equal to the target control force when the wheel passes the predicted passage position,
wherein the control method further comprising:
a step in which the control unit determines whether or not a predetermined condition is satisfied on a basis of the first data, the predetermined condition being satisfied when the time series change of the road surface displacement related value on the predicted route falls within a controllable range of the control force generating apparatus; and
a step in which the control unit executes a particular process for reducing a magnitude of the road surface displacement related value at the predicted passage position when the predetermined condition is not satisfied.

2. A control method according to claim 1, wherein the step of executing the particular process includes executing a high-pass filter process on the first data.

3. A control method according to claim 1, wherein the step of computing the target control force includes computing the target control force by using the road surface displacement related value at the predicted passage position and a gain for the road surface displacement related value at the predicted passage position; and
the step of executing the particular process includes reducing the gain in a case where the predetermined condition is not satisfied, so that the gain becomes smaller as compared with a case where the predetermined condition is satisfied.

4. A control method according to claim 1, wherein the step of executing the particular process includes:
computing an index value which represents a degree of deviation of the road surface displacement related value in the first data from the controllable range, and executing a process of reducing the magnitude of the road surface displacement related value at the predicted passage position to a degree that increases with the index value.

5. A control method according to claim 1, wherein the step of determining whether or not the predetermined condition is satisfied includes:
determining that the predetermined condition is satisfied when a maximum value of the magnitude of the road surface displacement related value in the first data is equal to or less than a threshold set on a basis of the controllable range of the control force generating apparatus, and
determining that the predetermined condition is not satisfied when the maximum value is greater than the threshold.

6. A control method according to claim 5,
wherein the control force generating apparatus includes an active stabilizer apparatus, and the wheel includes a first wheel on a left side of the vehicle and a second wheel on a right side of the vehicle, and
wherein the step of determining whether or not the predetermined condition is satisfied includes:
setting the threshold to a first value in the case where a first waveform represented by the first data for the first wheel and a second waveform represented by the first data for the second wheel are in phase relative to each other, and
setting the threshold to a second value greater than the first value in the case where the first waveform and the second waveform are in anti-phase relative to each other.

7. A control method according to claim 1, wherein the road surface displacement related value includes at least one of road surface displacement representing displacement of the road surface in the vertical direction, road surface displacement speed representing a derivative value of the road surface displacement with respect to time, unsprung displacement representing displacement of an unsprung portion of the vehicle in the vertical direction, and unsprung speed representing a derivative value of the unsprung displacement with respect to time.

8. A vehicle control apparatus comprising:
a control force generating apparatus configured to generate control force in a vertical direction for damping vibration of a sprung portion of a vehicle, the control force being applied between at least one wheel and a portion of a body of the vehicle, which portion corresponds to a position of the wheel; and
a control unit for controlling the control force generating apparatus,
the control unit being configured
to determine a predicted route that the wheel is predicted to pass,
to obtain first data from road surface information which is data in which a relationship is established between position information representing a position on a road surface and a road surface displacement related value which relates to a vertical displacement of the road surface at the position represented by the position information, the first data representing a time series change of the road surface displacement related value on the predicted route,
to obtain, from the first data, the road surface displacement related value at a predicted passage position that the wheel is predicted to pass when a predetermined time elapses from a present point in time,
to compute a target control force by using the road surface displacement related value at the predicted passage position, and
to execute preview vibration damping control for controlling the control force generating apparatus in such a manner that the control force becomes equal to the target control force when the wheel passes the predicted passage position,
wherein the control unit is further configured
to determine whether or not a predetermined condition is satisfied on a basis of the first data, the predetermined condition being satisfied when the time series change of the road surface displacement related value on the predicted route falls within a controllable range of the control force generating apparatus, and
to execute a particular process for reducing the road surface displacement related value at the predicted passage position when the predetermined condition is not satisfied.

* * * * *